(12) United States Patent
Velasquez et al.

(10) Patent No.: US 12,179,440 B2
(45) Date of Patent: Dec. 31, 2024

(54) SYSTEMS AND METHODS FOR SHAPING COMPOSITE STRUCTURES

(71) Applicant: The Boeing Company, Chicago, IL (US)

(72) Inventors: Luis F. Velasquez, Ladson, SC (US); Edward R. Duncan, Goose Creek, SC (US)

(73) Assignee: The Boeing Company, Arlington, VA (US)

( * ) Notice: Subject to any disclaimer, the term of this patent is extended or adjusted under 35 U.S.C. 154(b) by 5 days.

(21) Appl. No.: 18/045,257

(22) Filed: Oct. 10, 2022

(65) Prior Publication Data
US 2024/0116255 A1   Apr. 11, 2024

(51) Int. Cl.
*B29C 70/38*   (2006.01)
*B29C 70/56*   (2006.01)

(52) U.S. Cl.
CPC .............. *B29C 70/38* (2013.01); *B29C 70/56* (2013.01)

(58) Field of Classification Search
CPC ....... B29C 70/38; B29C 70/56; B29C 70/382; B29C 70/384; B29C 70/386; B29C 70/388; B29C 66/893
See application file for complete search history.

(56) References Cited

U.S. PATENT DOCUMENTS

| 9,636,876 B2 | 5/2017 | Lee et al. |
| 10,369,740 B2 | 8/2019 | Chapman et al. |
| 2010/0102482 A1* | 4/2010 | Jones ...................... B29C 43/58 264/320 |
| 2015/0041048 A1* | 2/2015 | Anderson .......... B29D 99/0003 156/196 |
| 2017/0008217 A1* | 1/2017 | Chapman ................ B29C 53/84 |
| 2021/0179292 A1* | 6/2021 | Ahn ........................ B29C 43/10 |

FOREIGN PATENT DOCUMENTS

| DE | 10 2018003235 | 9/2018 |
| EP | 3 835 047 | 6/2021 |

OTHER PUBLICATIONS

Translation of DE 102018003235 A1, Sep. 27, 2018, Eckhard Reese (Year: 2018).*
European Patent Office, "Extended European Search Report," App. No. 23195609.5 (Feb. 22, 2024).

* cited by examiner

*Primary Examiner* — George R Koch
(74) *Attorney, Agent, or Firm* — Walters & Wasylyna LLC

(57) ABSTRACT

A method for shaping a composite structure includes steps of: (1) holding a composite member in an initial contour along a length of the composite member; and (2) forming a final contour along the length of the composite member by: (3) sequentially shaping formed portions of the composite member while holding unformed portions of the composite member in the initial contour to form portions of the final contour; and (4) sequentially shaping the unformed portions of the composite member to form other portions of the final contour.

20 Claims, 21 Drawing Sheets

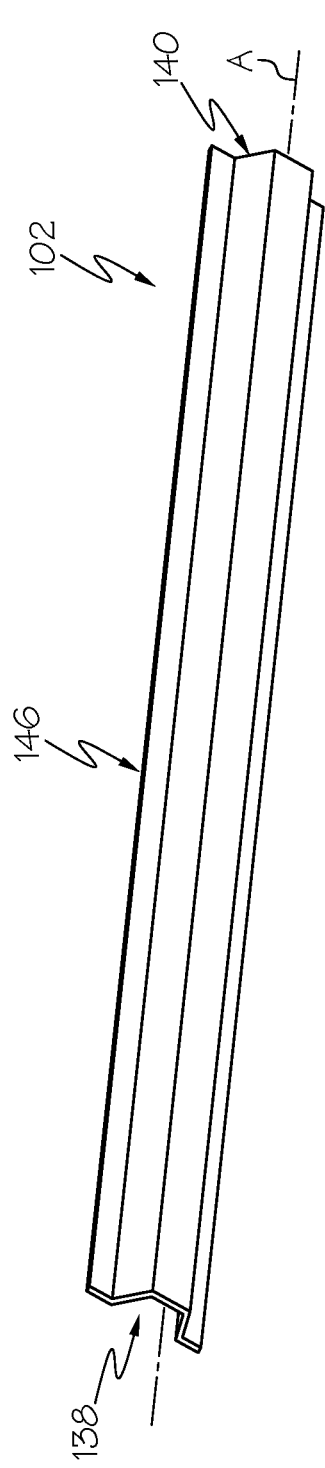
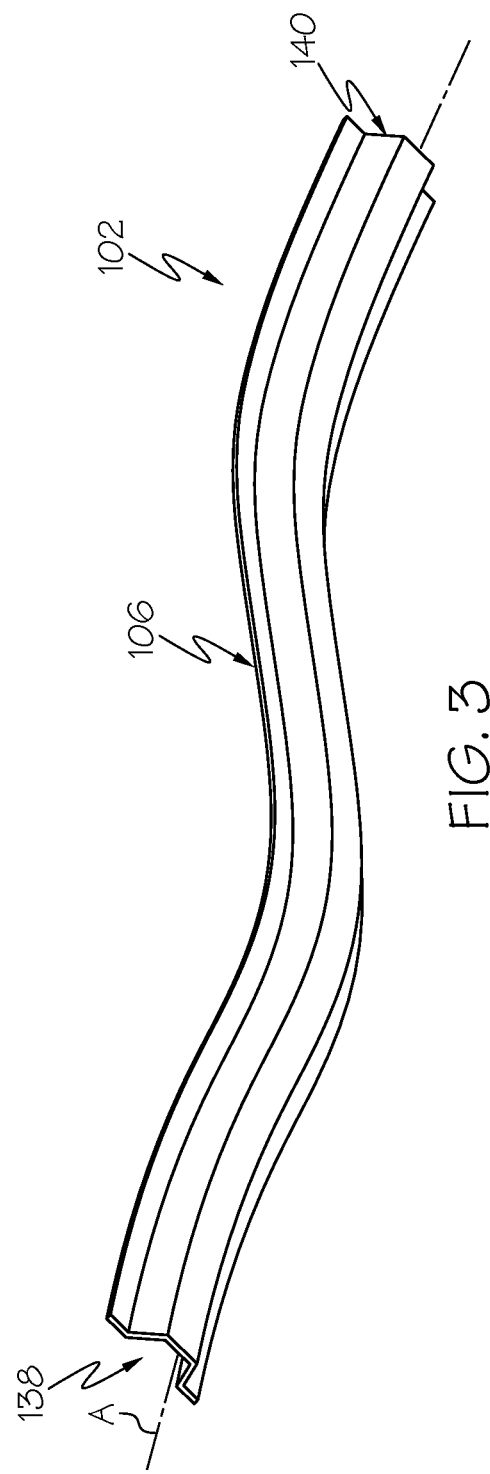

SYSTEMS AND METHODS FOR SHAPING COMPOSITE STRUCTURES

FIELD

The present disclosure relates generally to composite manufacturing and, more particularly, to systems and methods for picking, placing, and shaping uncured composite members.

BACKGROUND

A composite structure is typically formed by placing plies or layers of composite material on a forming tool that sets forth the shape and/or contour of the composite structure. Once placed, composite material is then consolidated and/or cured to form the composite structure. However, known techniques for transporting a composite material to a forming tool, placing a composite material on a forming tool, and consolidating a composite material on a forming tool may be labor-intensive and time-consuming. Additionally, depending upon the degree of contour and geometry of the composite structure, special handling may be required to prevent introduction of defects during transfer and placement of the composite material. Accordingly, those skilled in the art continue with research and development efforts in the field of composite manufacturing.

SUMMARY

Disclosed are examples of a method for shaping a composite structure, a system for forming a composite structure, and an automated method for shaping a composite structure. The following is a non-exhaustive list of examples, which may or may not be claimed, of the subject matter according to the present disclosure.

In an example, the disclosed method includes steps of: (1) holding a composite member in an initial contour along a length of the composite member; and (2) forming a final contour along the length of the composite member by: (3) sequentially shaping unformed portions of the composite member into formed portions of the composite member while holding remaining unformed portions of the composite member in the initial contour to form portions of the final contour; and (4) sequentially shaping the remaining unformed portions of the composite member to form other portions of the final contour.

In an example, the disclosed system includes a plurality of automated manipulators configured to manipulate a composite member. The system also includes a controller configured to execute instructions. Execution of the instructions causes the controller to perform operations using the automated manipulators. The operations including: (1) holding the composite member in an initial contour along a length of the composite member; (2) placing the composite member on a place tool; and (3) forming a final contour along the length of the composite member while placing the composite member on the place tool by: (4) sequentially shaping unformed portions of the composite member into formed portions of the composite member while holding remaining unformed portions of the composite member in the initial contour to form portions of the final contour; and (5) sequentially shaping the remaining unformed portions of the composite member to form other portions of the final contour.

In an example, the disclosed automated method includes steps of: (1) using a plurality of automated manipulators to hold a composite member in an initial contour along a length of the composite member; and (2) synchronizing motion of the automated manipulators to form a final contour along the length of the composite member, wherein the final contour is formed by: (3) sequentially shaping unformed portions of the composite member into formed portions of the composite member on a place tool while holding remaining unformed portions of the composite member in the initial contour to form portions of the final contour; and (4) sequentially shaping the remaining unformed portions of the composite member on the place tool to form other portions of the final contour.

Other examples of the disclosed method, system, and automated method will become apparent from the following detailed description, the accompanying drawings, and the appended claims.

BRIEF DESCRIPTION OF THE DRAWINGS

FIG. 2 is a schematic illustration of an example of a composite member having an initial contour;

FIG. 3 is a schematic illustration of an example of the composite member having a final contour;

DETAILED DESCRIPTION

Figure 1:
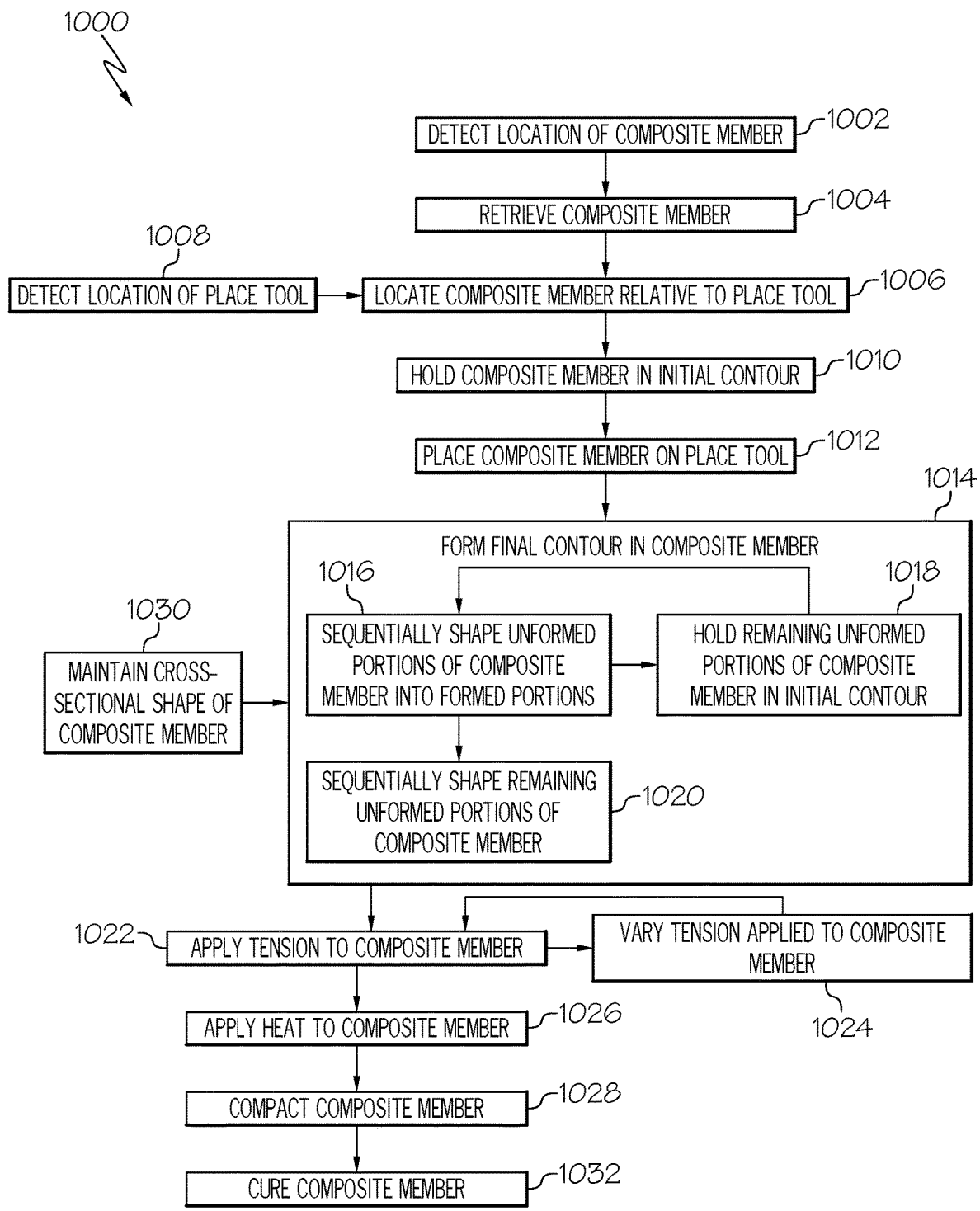
FIG. 1 is a flow diagram of an example of a method for shaping a composite structure.

Referring generally to FIGS. 1-20, the present disclosure is directed to methods and systems for shaping composite structures. More particularly, the present disclosure is directed to a method 1000 (FIG. 1), a system 200 (FIG. 12), and an automated method 2000 (FIG. 20) for retrieving a composite member 102, having an initial contour 146, and forming the composite member 102 into a desired, final contour 106 while placing the composite member 102.

For the purpose of the present disclosure, the composite member 102 includes or is formed from an uncured composite material 108. For the purpose of the present disclosure, the composite structure 100 includes or is formed by a cured composite material. In other words, the composite structure 100 refers to the composite member 102 after a curing operation.

Figure 12:
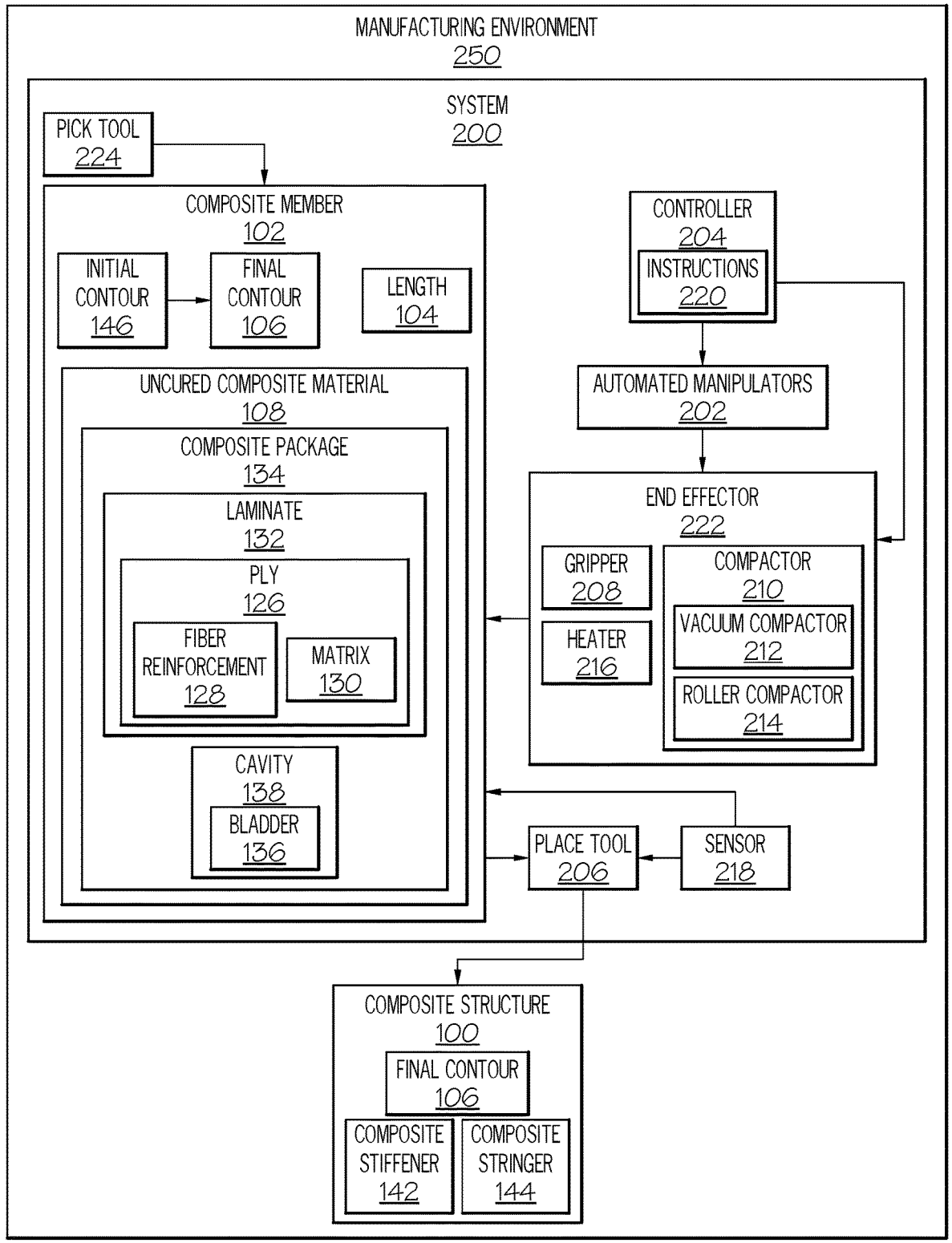
FIG. 12 is a schematic block diagram of an example of a system for shaping a composite member.

Referring briefly to FIG. 12, the uncured composite material 108 includes any suitable base materials used in composite manufacturing. Generally, the uncured composite material 108 and, thus, the cured composite material, includes a fiber reinforcement 128 and a matrix 130. In one or more examples, the uncured composite material 108 may also include one or more additives, such as, but not limited to, thermoplastic toughening additives, curing agents, binders, and the like.

In one or more examples, the uncured composite material 108 includes the fiber reinforcement 128 that is impregnated with the matrix 130, also referred to as a pre-preg. In these examples, the fiber reinforcement 128 is impregnated (e.g., pre-impregnated) with the matrix 130 before the placement on a forming tool (e.g., a place tool 206).

In one or more examples, the uncured composite material 108 includes the fiber reinforcement 128 without the matrix 130, also referred to dry fiber. In these examples, the fiber reinforcement 128 is infused with the matrix 130 after placement of the uncured composite material 108 on a forming tool (e.g., the place tool 206).

The fiber reinforcement 128 includes any suitable type of reinforcement material, such as carbon fiber, glass fiber, aramid fiber, etc., having any suitable form, such as woven, nonwoven, fabric, tape, etc. The matrix 130 includes any suitable type of the matrix material, such as resin, epoxy, polymer, thermoplastic, thermoset, etc.

Referring still to FIG. 12, the composite member 102 can take any one of various forms. In one or more examples, the composite member 102 includes a ply 126 of the uncured composite material 108. As an example, the ply 126 is a single layer of the fiber reinforcement 128 pre-impregnated with the matrix 130. As another example, the ply 126 is a single layer of the (e.g., dry) fiber reinforcement 128.

In one or more examples, the composite member 102 includes a laminate 132 of the uncured composite material 108. As an example, the composite member 102 includes a plurality of plies 126. In one or more examples, the laminate 132 is laid up or otherwise formed on a forming tool (e.g., the place tool 206). As an example, the laminate 132 is a wet layup (e.g., plies 126 of the fiber reinforcement 128 pre-impregnated with the matrix 130). As another example, the laminate 132 is a dry layup (e.g., plies 126 of the fiber reinforcement 128 without the matrix 130).

In one or more examples, the composite member 102 includes an assembly of composite components, referred to herein as a composite package 134. As an example, the composite package 134 includes the laminate 132 (e.g., plies 126 of the fiber reinforcement 128 impregnated with the matrix 130). In one or more examples, the composite package 134 also includes other components utilized in composite manufacturing.

In one or more examples, the laminate 132 has a cross-sectional shape 140 (e.g., an open cross-sectional shape) that forms a cavity 138 (e.g., shown in FIGS. 2 and 3). In one or more examples, the composite package 134 includes a bladder 136. The bladder 136 is received by the cavity 138 formed by the cross-sectional shape 140 of the laminate 132. The bladder 136 supports the cross-sectional shape 140 of the laminate 132 during placement and/or cure of the composite member 102.

In one or more examples, the composite package 134 also includes one or more additional or auxiliary components used in a composite manufacturing or curing operation. As an example, the composite package 134 includes a radius filler (e.g., noodle) that fills an interface between plies in a laminated joint. As another example, the composite package 134 includes one or more additional uncured composite materials, which are co-cured with the laminate 132 to form a complex composite structure.

Referring briefly to FIGS. 2 and 3, in one or more examples, the composite member 102 and, thus, the composite structure 100 formed from the composite member 102 is elongated along a length 104 (FIG. 12). As an example, the composite member 102 has a relatively high aspect ratio and has a length dimension that is magnitudes of order greater than a width dimension.

Generally, the composite member 102 is provided in or has the initial contour 146 (e.g., as shown in FIG. 2). The initial contour 146 refers to the curvature, bend, twist, or shape along a longitudinal axis A of the composite member 102 prior to retrieving and placing the composite member 102 on the place tool 206 (FIG. 12). In one or more examples, the initial contour 146 is straight, such as at least approximately straight or substantially straight, in which the composite member 102 has little to no curvature, bend, or twist along the longitudinal axis A. In one or more examples, the initial contour 146 is not substantially straight or otherwise includes a minor or relatively low degree of curvature, bend, or twist along the longitudinal axis A. In other examples, the initial contour 146 includes other degrees of curvature, bend, or twist along the longitudinal axis A.

During and/or after placement of the composite member 102 on the place tool 206 (FIG. 12), the composite member 102 has the final contour 106 (e.g., shown in FIG. 3). The final contour 106 refers to the curvature, bend, twist, or shape along the longitudinal axis A of the composite member 102 after placing and shaping the composite member 102 on the place tool 206. In one or more examples, the final contour 106 includes a relatively complex curvature or a relatively high degree of curvature, bend, or twist along the longitudinal axis A. The degree of curvature, bend, or twist of the final contour 106 depends on the contour of the place tool 206, the desired final contour of the composite structure 100, the intended use or application of the composite structure 100, and the like. As examples, the final contour 106 can include one or more of a lengthwise (e.g., XZ-plane) bend or curvature, a side-to-side (e.g., XY-plane) bend or curvature, and a twist about the longitudinal axis A.

Referring now to FIG. 1, which illustrates an example of the method 1000 for shaping the composite structure 100. The method 1000 facilitates forming the composite member 102 from the initial contour 146 (e.g., as shown in FIG. 2) to the final contour 106 (e.g., as shown in FIG. 3).

In one or more examples, the method 1000 includes a step of (block 1002) detecting or otherwise determining a location of the composite member 102. Detecting the location of the composite member 102 enables automatic retrieval of the composite member 102.

In one or more examples, the method 1000 includes a step of (block 1004) retrieving the composite member 102. In one or more examples, the composite member 102 is provided in or otherwise has the initial contour 146 prior to and/or during the step of (block 1004) retrieving the composite member 102.

In one or more examples, the composite member 102 has the initial contour 146 along the length 104 of the composite member 102 before the step of (block 1004) retrieving the composite member 102. In one or more examples, the composite member 102 is formed, maintained, or otherwise held in the initial contour 146 during the step of (block 1004) retrieving the composite member 102.

Figure 19:
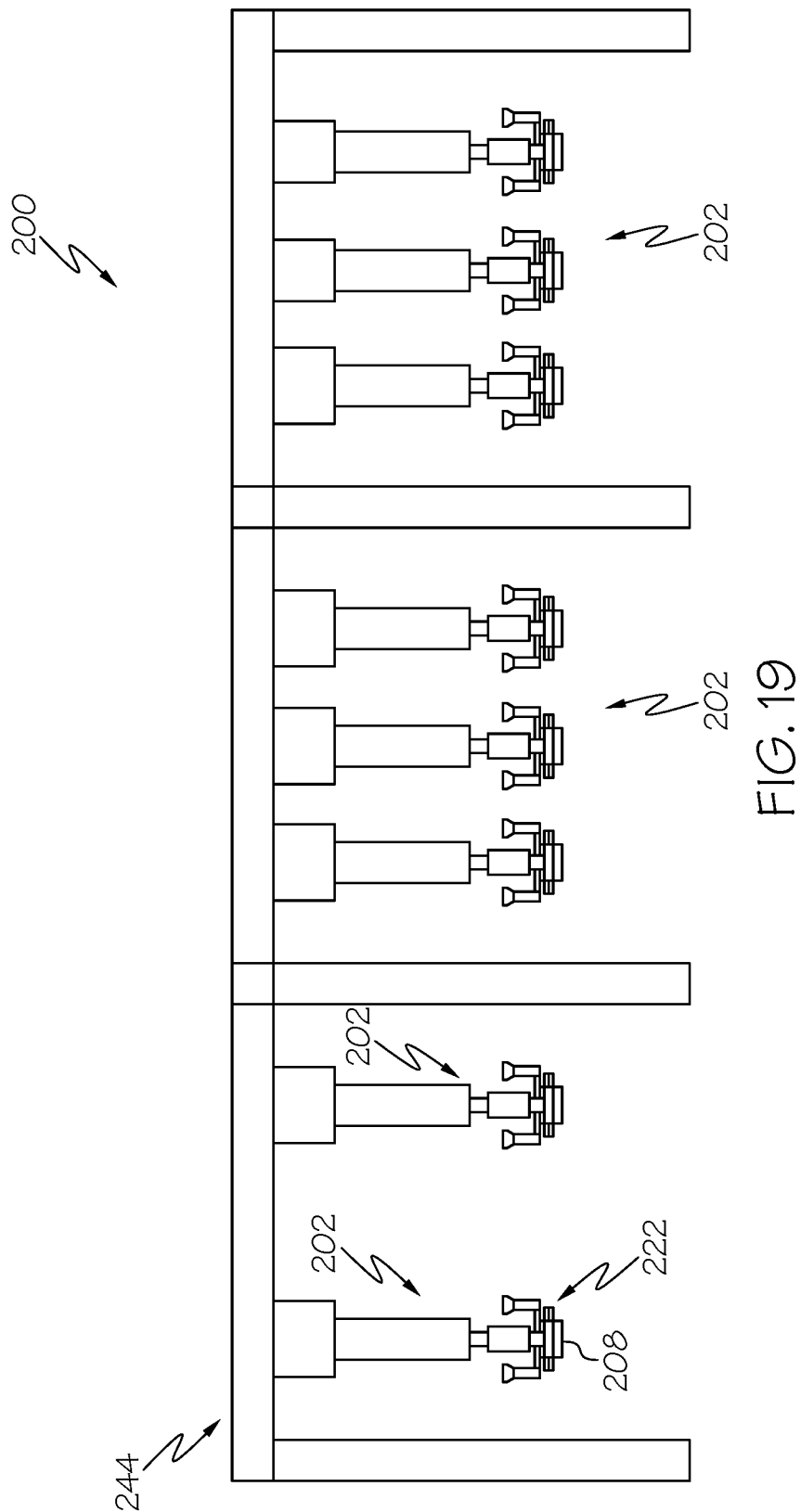
FIG. 19 is a schematic illustration of an example of a portion of the system.

In one or more examples, the step of (block 1004) retrieving the composite member 102 includes a step of picking or otherwise removing the composite member 102 from a pick tool 224 (FIG. 19). In one or more examples, the composite member 102 has the initial contour 146 on the pick tool 224 and is substantially maintained in the initial contour 146 during the step of picking.

In one or more examples, the step of (block 1004) retrieving the composite member 102 includes a step of transferring or otherwise moving the composite member 102 from the pick tool 224 to the place tool 206 (FIG. 12). In one or more examples, the composite member 102 is maintained or otherwise held in the initial contour 146, as picked, during the step of transferring. In one or more examples, the composite member 102 is formed in the initial contour 146, after picking and during the step of transferring.

Figure 13:
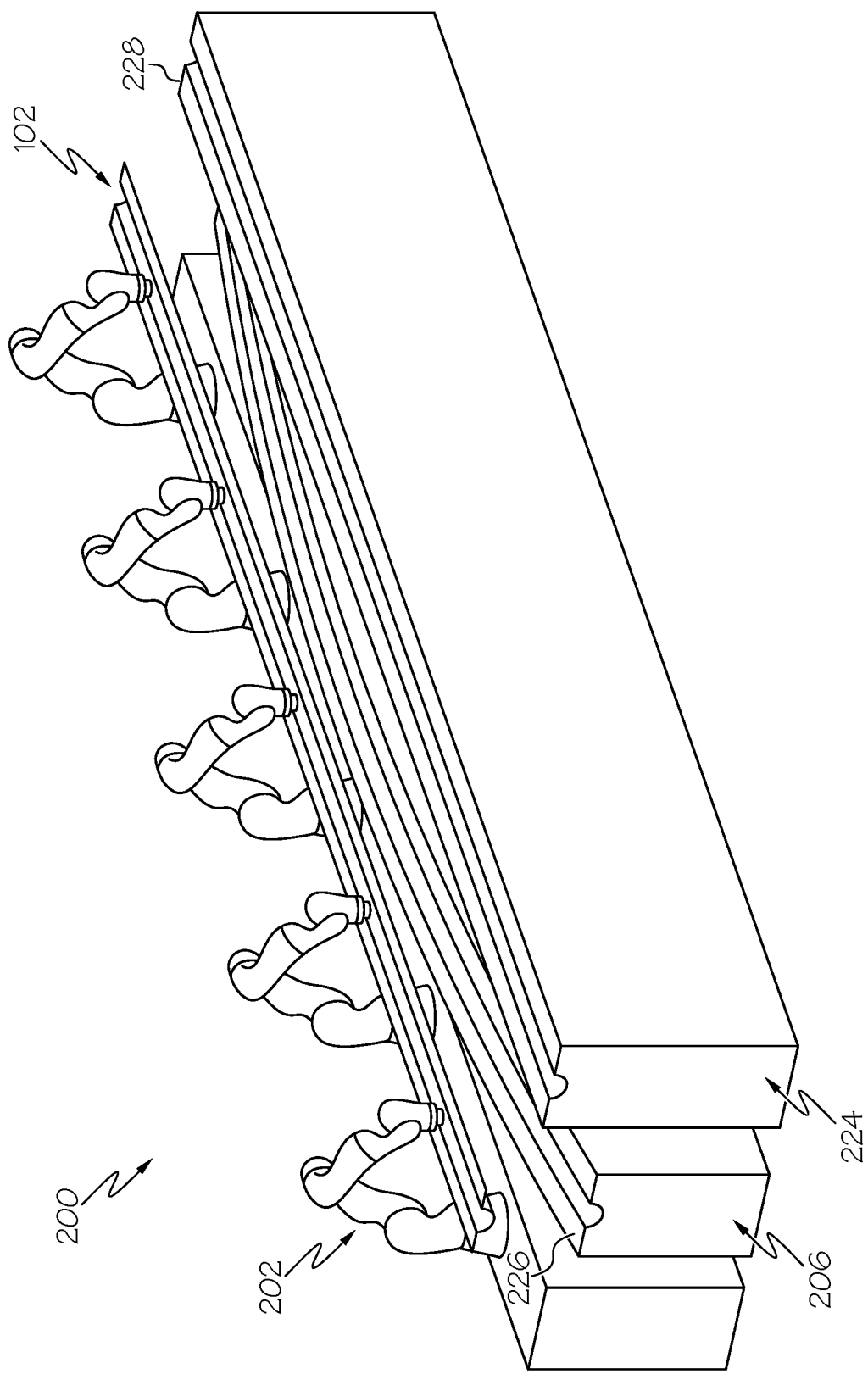
FIG. 13 is a schematic illustration of an example of the system.
Figure 14:
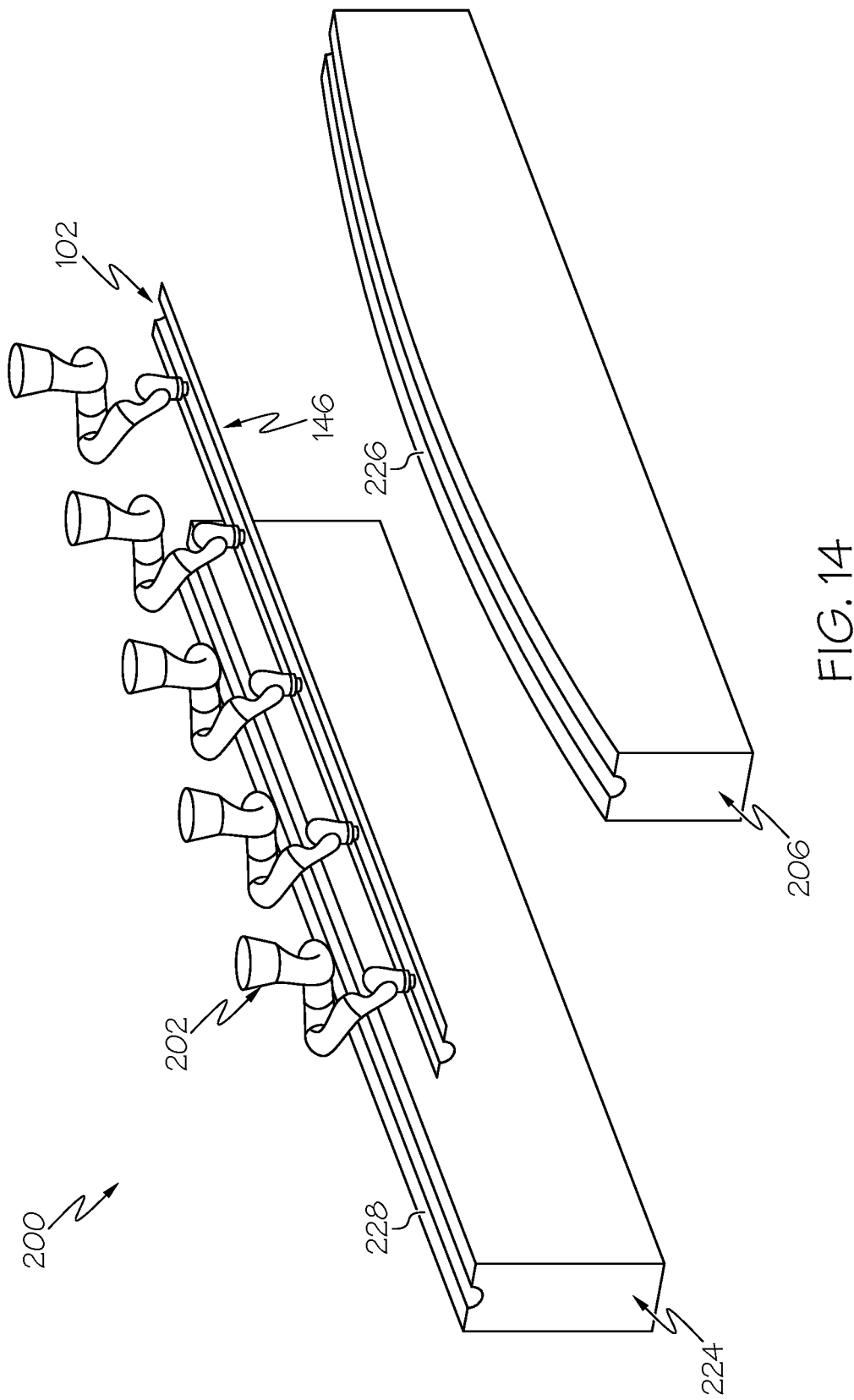
FIG. 14 is a schematic illustration of an example of the system.

Referring briefly to FIGS. 12-14, in one or more examples, the composite member 102 is provided on the pick tool 224. The pick tool 224 is configured to support the composite member 102 for retrieval. In one or more examples, the pick tool 224 supports and presents the composite member 102 in the initial contour 146. As an example, the pick tool 224 includes a pick-tool surface 228 (e.g., as shown in FIGS. 13 and 14) that includes a contour that substantially matches and sets forth the initial contour 146 of the composite member 102. In one or more examples, the pick tool 224 supports and presents the composite member 102 in a condition other than the initial contour 146. In these examples, the composite member 102 is shaped in the initial contour 146 after being retrieved (e.g., picked and removed) from the pick tool 224.

Referring again to FIG. 1, in one or more examples, the method 1000 includes a step of (block 1006) locating the composite member 102 relative to the place tool 206. As an example, the composite member 102 is located (e.g., moved) relative to a first (e.g., initial) contact point 230A (FIGS. 4A, 4B, 8A and 8B) of the place tool 206. Locating the composite member 102 relative to the place tool 206, such as relative to the initial contact point 230A on a place-tool surface 226 of the place tool 206, properly positions the composite member 102 for shaping from the initial contour 146 to the final contour 106 while placing the composite member 102 on the place tool 206.

In one or more examples, the method 1000 includes a step of (block 1008) detecting or otherwise determining a location of the place tool 206. In one or more examples, the method 1000 includes a step of adjusting the location of the composite member 102 relative to the place tool 206 based on the location detected. Detecting the location of the place tool 206 enables automatic locating of the composite member 102 relative to the place tool 206 prior to placement of the composite member 102 on the place tool 206.

Referring to FIG. 1 and to FIGS. 4A, 4B, 8A and 8B, in one or more examples, the method 1000 includes a step of (block 1010) holding the composite member 102 in the initial contour 146 along the length 104 of the composite member 102. In one or more examples, the composite member 102 is held in the initial contour 146 during and/or after the step of (block 1004) retrieving the composite member 102 and/or the step of (block 1006) locating the composite member 102. As will be further described herein below, in one or more examples, portions of the composite member 102 are held in the initial contour 146 during placement of the composite member 102 on the place tool 206 and during formation of the final contour 106.

Referring still to FIG. 1 and to FIGS. 4A, 4B, 8A and 8B, in one or more examples, the method 1000 includes a step of (block 1012) placing the composite member 102 on the place tool 206. In one or more examples, a portion of the composite member 102 is placed on the place-tool surface 226 at the first contact point 230A (e.g., as shown in FIGS. 4A, 4B, 8A and 8B).

As will be further described herein below, remaining portions of the composite member 102 are sequentially placed on subsequent contact points on the place-tool surface 226 of the place tool 206 (e.g., as shown in FIGS. 5A, 5B, 6A, 6B, 7A, 7B, 9A, 9B, 10A, 10B, 11A and 11B) as the composite member 102 is formed into the final contour 106.

Referring to FIG. 1, in one or more examples, the method 1000 includes a step of (block 1014) forming the final contour 106 along the length 104 of the composite member 102. In one or more examples, the step of (block 1014) forming the final contour 106 is performed during the step of (block 1012) placing the composite member 102 on the place tool 206.

Generally, the step of (block 1014) forming the final contour 106 includes sequentially forming portions of the final contour 106 by sequentially forming or shaping the composite member 102 into formed portions 148 on the place tool 206, while holding unformed portions 150 of the composite member 102 in the initial contour 146.

For the purpose of the present disclosure, an unformed portion of the composite member 102 refers to any portion of the composite member that has the initial contour 146, that has yet to be formed into the final contour 106, and/or that has yet to be placed on the place tool 206. For the purpose of the present disclosure, a formed portion of the composite member 102 refers to any portion of the composite member that has been formed into a portion of the final contour 106 and/or that has been placed on the place tool 206.

Referring now to FIG. 1 and to FIGS. 5A-7B and 9A-11B, in one or more examples, the step of (block 1014) forming the final contour 106 includes a step of sequentially shaping or forming formed portions 148 of the composite member 102 on the place tool 206.

Referring to FIG. 1 and to FIGS. 5A-6B and 9A-10B, in one or more examples, the step of (block 1014) forming the final contour 106 includes a step of (block 1016) sequentially forming or shaping the unformed portions 150 of the composite member 102 into the formed portions 148 of the composite member 102.

Referring to FIG. 1 and to FIGS. 5A-6B and 9A-10B, the step of (block 1014) forming the final contour 106 also includes a step of (block 1018) holding remaining unformed portions 174 of the composite member 102 in the initial contour 146.

In one or more examples, the step of (block 1018) holding the remaining unformed portions 174 in the initial contour 146 is performed during the step of (block 1016) sequentially forming or shaping the unformed portions 150 into the formed portions 148. The step of (block 1016) sequentially forming or shaping the unformed portions 150 into the formed portions 148 and the step of (block 1018) holding the remaining unformed portions 174 in the initial contour 146 form or produce portions 152 of the final contour 106.

Referring still to FIG. 1 and to FIGS. 7A, 7B, 11A and 11B, the step of (block 1014) forming the final contour 106 further includes a step of (block 1020) sequentially forming or shaping the remaining unformed portions 174 of the composite member 102 into the formed portions 148 to form other portions 154 of the final contour 106.

Generally, upon forming all of the unformed portions 150 into the formed portions 148, an entirety of the final contour 106 is formed in the composite member 102.

Referring to FIG. 1 and to FIGS. 4A-11B, in one or more examples, the method 1000 includes a step of (block 1022) applying tension 156 to at least a portion of the composite member 102 during the step of (block 1014) forming the final contour 106 along the length 104 of the composite member 102. As an example, the tension 156 is applied to at least one of the unformed portions 150 or at least one of the remaining unformed portions 174 of the composite member 102 while forming portions of the final contour 106 along the length 104 of the composite member 102.

In one or more examples, the method 1000 also includes a step of (block 1024) varying the tension 156 applied to at least a portion of the composite member 102 during the step of (block 1014) forming the final contour 106. As an example, the tension 156 applied to the composite member 102 is varied or is selectively controlled and adjusted to at least one of the unformed portions 150 or at least one of the remaining unformed portions 174 of the composite member 102 while forming portions of the final contour 106 along the length 104 of the composite member 102.

Applying the tension 156 and/or selectively controlling and/or adjusting the tension 156 applied to at least a portion of the composite member 102 while forming the final contour 106 advantageously reduces the likelihood of wrinkles to form in the composite member 102 while being placed and shaped on the place tool 206.

Figure 4A:
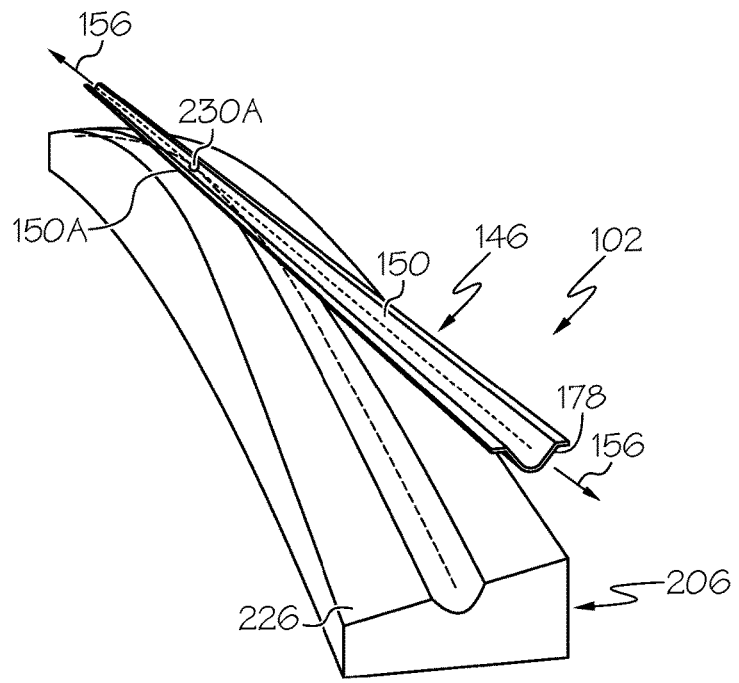
FIGS. 4A-7B are schematic illustrations of an example of the composite member at various stages of a shaping operation.

As illustrated in FIGS. 4A-11B, the method 1000 can have different sequences of placing and shaping portions of the composite member 102. The composite member 102 includes a first end 176 and a second end 178, opposite the first end 176 (FIGS. 4A and 8A). As illustrated in FIGS. 4A-7B, in one or more examples, the placing and shaping sequence is performed from an intermediate portion of the composite member 102 outward along the length 104 toward the first end 176 and the second end 178. As illustrated in FIGS. 8A-11B, in one or more examples, the placing and shaping sequence is performed from the first end 176 of the composite member 102 along the length 104 toward the second end 178.

Figure 4B:
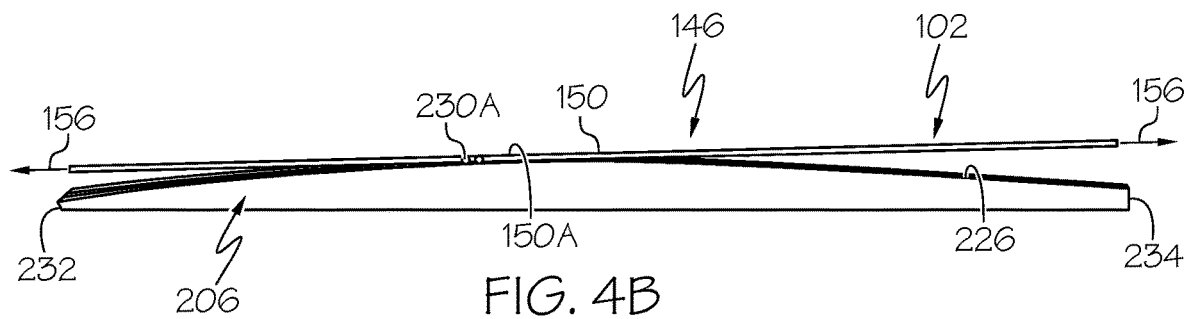

Referring to FIGS. 4A and 4B, in one or more examples, the composite member 102 is held in the initial contour 146 relative to the place tool 206. A first unformed portion 150A of the composite member 102, located between the first end 176 and the second end 178, is placed in contact with the place-tool surface 226 at the first contact point 230A, located between a first tool-end 232 and a second tool-end 234 of the place tool 206. The composite member 102 is formed into the final contour 106 by sequentially shaping the unformed portions of the composite member 102 along the length 104 toward the first end 176 and toward the second end 178 while holding remaining unformed portions in the initial contour 146.

Figure 5A:
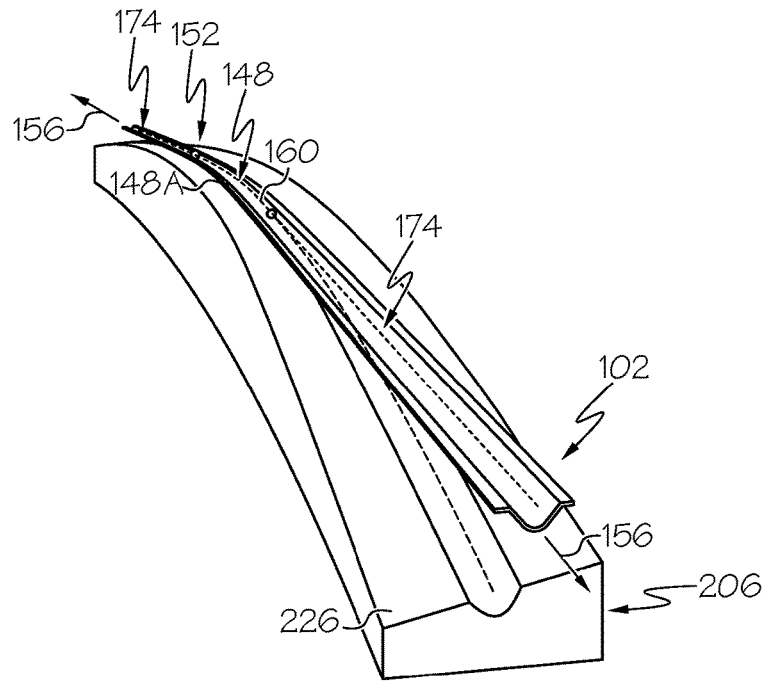
Figure 5B:
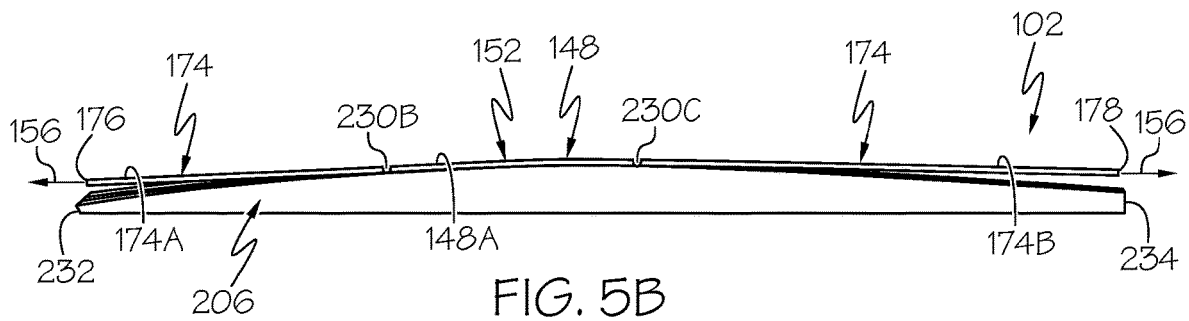

Referring to FIGS. 5A and 5B, in one or more examples, a first formed portion 148A of the composite member 102 is shaped on the place tool 206 to form a first contour portion 160 (FIG. 5A) of the final contour 106 while holding a first remaining unformed portion 174A of the composite member 102, extending from the first formed portion 148A towards the first end 176, and a second remaining unformed portion 174B, extending from the first formed portion 148A toward the second end 178, in the initial contour 146. For example, the composite member 102 is placed into contact with the place-tool surface 226 at a second contact point 230B and a third contact point 230C to shape the first formed portion 148A. The second contact point 230B is spaced away from the first contact point 230A toward the first tool-end 232. The third contact point 230C is spaced away from the first contact point 230A toward the second tool-end 234.

Figure 6A:
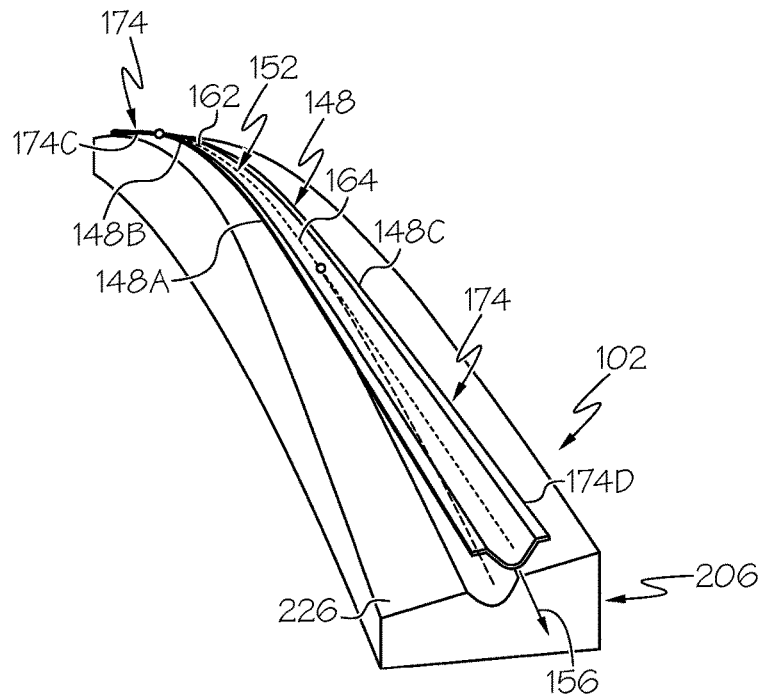
Figure 6B:
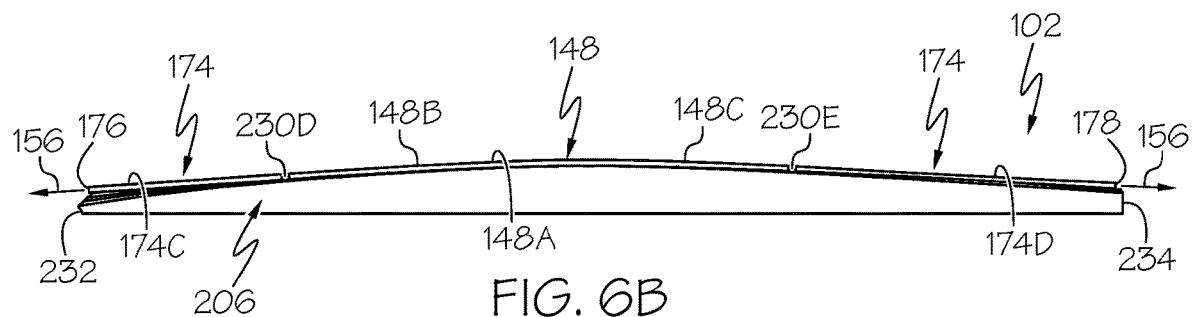

Referring to FIGS. 6A and 6B, in one or more examples, a second formed portion 148B of the composite member 102, extending from the first formed portion 148A, is shaped on the place tool 206 to from a second contour portion 162 (FIG. 6A) of the final contour 106 while holding a third remaining unformed portion 174C of the composite member 102, extending from the second formed portion 148B toward the first end 176, in the initial contour 146. A third formed portion 148C of the composite member 102, extending from the first formed portion 148A opposite the second formed portion 148B, is shaped to from a third contour portion 164 (FIG. 6A) of the final contour 106 while holding a fourth remaining unformed portion 174D of the composite member 102, extending from the third formed portion 148C toward the second end 178, in the initial contour 146. For example, the composite member 102 is placed into contact with the place-tool surface 226 at a fourth contact point 230D and a fifth contact point 230E to shape the second formed portion 148B and the third formed portion 148C. The fourth contact point 230D is spaced away from the second contact point 230B toward the first tool-end 232. The fifth contact point 230E is spaced away from the third contact point 230C toward the second tool-end 234.

Figure 7A:
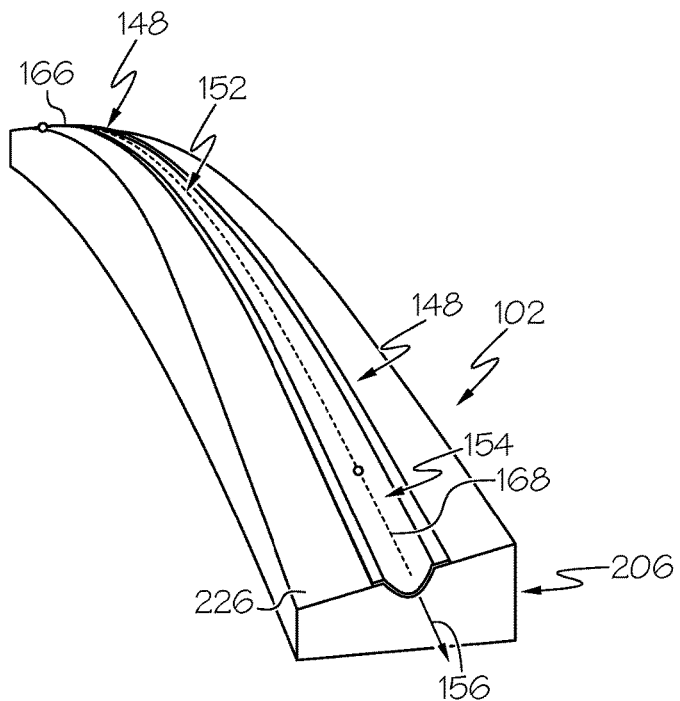
Figure 7B:
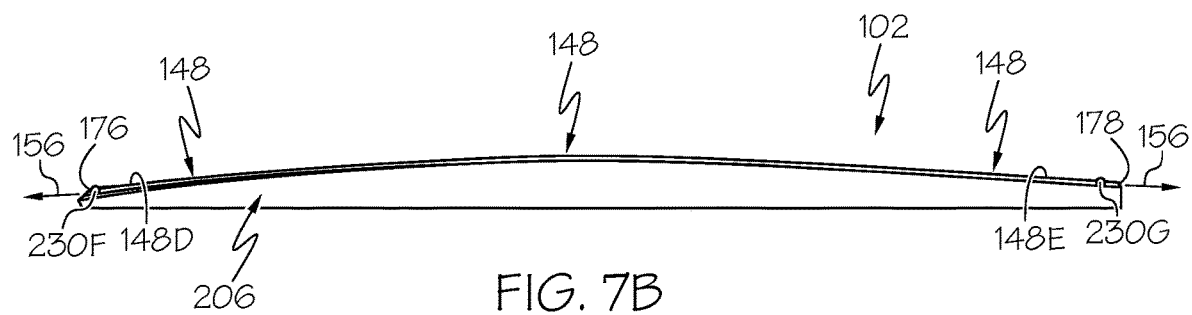

Referring to FIGS. 7A and 7B, in one or more examples, a fourth formed portion 148D of the composite member 102, extending from the second formed portion 148B, is shaped to from a fourth contour portion 166 (FIG. 7A) of the final contour 106. A fifth formed portion 148E of the composite member 102, extending from the third formed portion 148C, is shaped to from a fifth contour portion 168 (FIG. 7A) of the final contour 106. For example, the composite member 102 is placed into contact with the place-tool surface 226 at a sixth contact point 230F and a seventh contact point 230G to shape the fourth formed portion 148D and the fifth formed portion 148E. The sixth contact point 230F is spaced away from the fourth contact point 230D toward the first tool-end 232. The seventh contact point 230G is spaced away from the fifth contact point 230E toward the second tool-end 234.

The examples described above and depicted in FIGS. 4A-7B are illustrative of a forming sequence that begins at an intermediate portion of the composite member 102 and that shapes sequential portions of the composite member 102 along the length 104 toward opposing ends of the composite member 102. While the illustrate examples describe and depict a number of (e.g., five) portions of the composite member 102 being sequentially placed on the place tool 206 and formed into portions of the final contour 106, the disclosed method 1000 is not limited to any particular number of portions. For example, the placing and forming steps describe above can be applied to any number of (e.g., less than five or greater than five) portions of the composite member 102.

In one or more examples, the tension 156 is applied and/or selectively controlled along the length 104 of the composite member 102 between the first end 176 and the second end 178. In one or more examples, the tension 156 is applied and/or selectively controlled along a portion of the length 104 of the composite member 102, such as between one of the formed portions 148 and an adjacent one of the remaining unformed portions 174 or between one of the formed portions 148 and at least one of the first end 176 and the second end 178.

As an example, the tension 156 can be selectively controlled and applied along at least a portion of the length 104 of the composite member 102 between the first end 176 and the second end 178 while forming (e.g., placing and/or shaping) the first formed portion 148A. As another example, the tension 156 can be applied along at least a portion of the length 104 of the composite member 102 between the first formed portion 148A and the first end 176 while forming (e.g., placing and/or shaping) at least one of the second formed portion 148B, the fourth formed portion 148D, and any other formed portions 148 between the first formed portion 148A and the first end 176. As another example, the tension 156 can be applied along at least a portion of the length 104 of the composite member 102 between the first formed portion 148A and second end 178 while forming (e.g., placing and/or shaping) at least one of the third formed portion 148C, the fifth formed portion 148E, and any other formed portions 148 between the first formed portion 148A and the second end 178. As another example, the tension 156 can be applied along a portion of the length 104 of the composite member 102 between any two of the contact points on the place-tool surface 226.

In one or more examples, more than one portion of the composite member 102 is formed (e.g., placed and/or shaped) on the place tool 206 concurrently or approximately simultaneously. As an example, the second formed portion 148B of the composite member 102 and the third formed portion 148C of the composite member 102 can be formed (e.g., placed and/or shaped) at least approximately concurrently. As another example, the fourth formed portion 148D of the composite member 102 and the fifth formed portion 148E of the composite member 102 can be formed (e.g., placed and/or shaped) at least approximately concurrently.

In one or more examples, each portion of the composite member 102 is formed (e.g., placed and/or shaped) on the place tool 206 consecutively or successively. As an example, the second formed portion 148B of the composite member 102 and the third formed portion 148C of the composite member 102 are formed (e.g., placed and/or shaped) consecutively. As another example, the fourth formed portion 148D of the composite member 102 and the fifth formed portion 148E of the composite member 102 are formed (e.g., placed and/or shaped) consecutively.

Figure 8A:
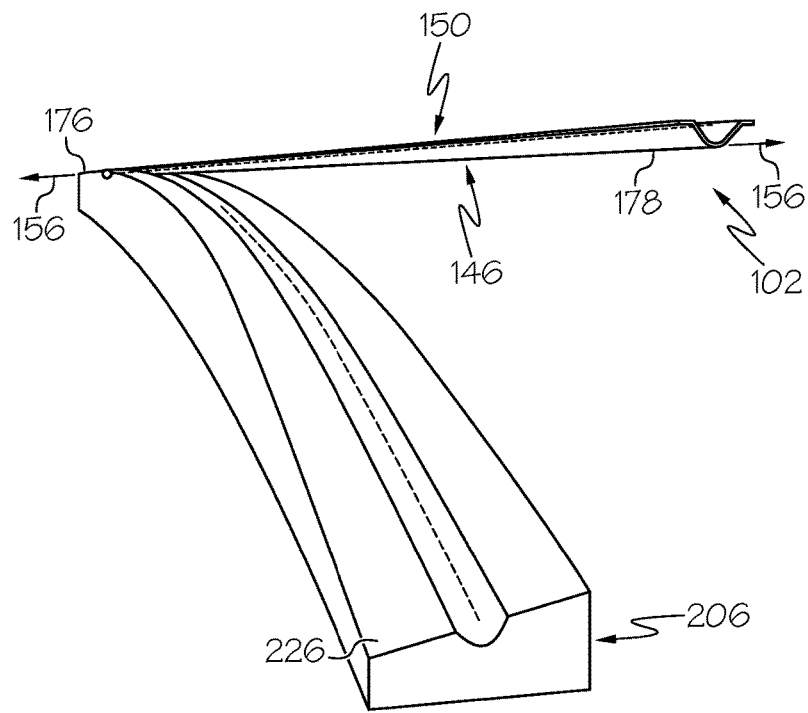
FIGS. 8A-11B are schematic illustrations of an example of the composite member at various stages of a shaping operation.
Figure 8B:
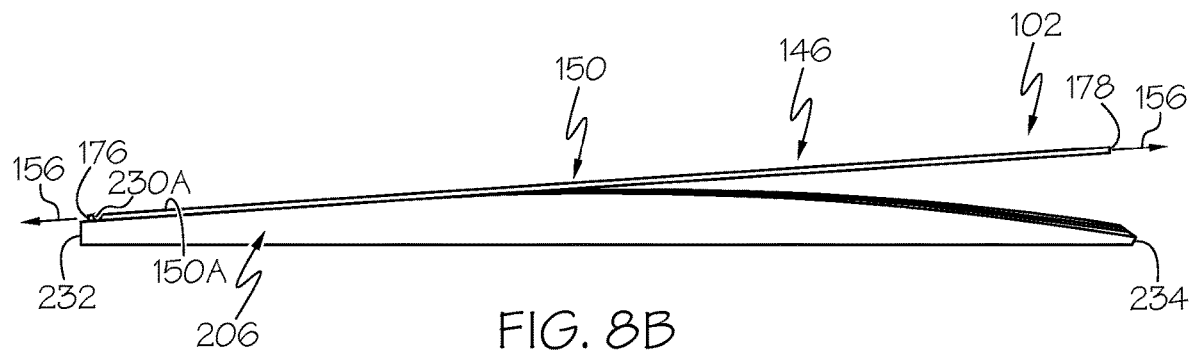

Referring to FIGS. 8A and 8B, in one or more examples, the composite member 102 is held in the initial contour 146 relative to the place tool 206. A first unformed portion 150A of the composite member 102, located proximate (e.g., at or near) the first end 176, is placed in contact with the place-tool surface 226 at the first contact point 230A, located proximate (e.g., at or near) the first tool-end 232 of the place tool 206. The composite member 102 is formed into the final contour 106 by sequentially shaping the unformed portions of the composite member 102 along the length 104 toward the first end 176 and toward the second end 178 while holding remaining unformed portions in the initial contour 146.

Figure 9A:
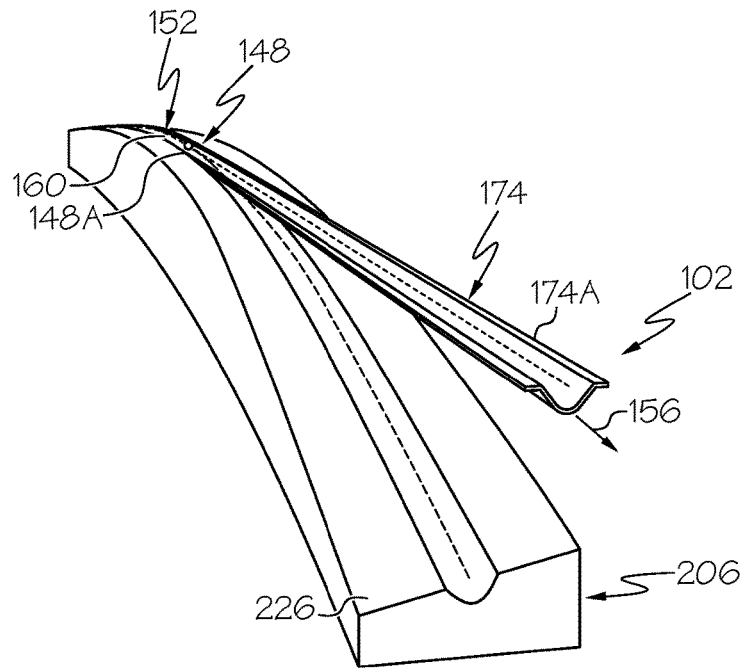
Figure 9B:
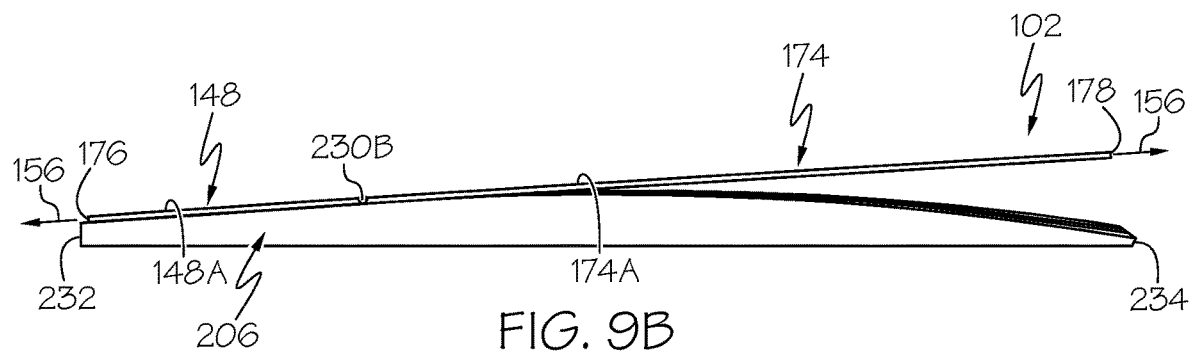

Referring to FIGS. 9A and 9B, in one or more examples, a first formed portion 148A of the composite member 102 is shaped on the place tool 206 to form the first contour portion 160 (FIG. 9A) of the final contour 106 while holding a first remaining unformed portion 174A of the composite member 102, extending from the first formed portion 148A towards the second end 178, in the initial contour 146. For example, the composite member 102 is placed into contact with the place-tool surface 226 at the second contact point 230B to shape the first formed portion 148A. The second contact point 230B is spaced away from the first contact point 230A toward the second tool-end 234.

Figure 10A:
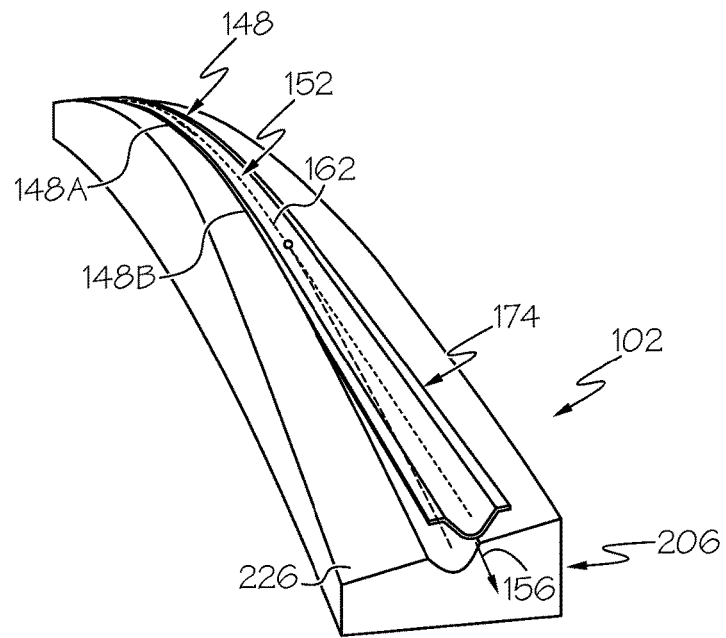
Figure 10B:
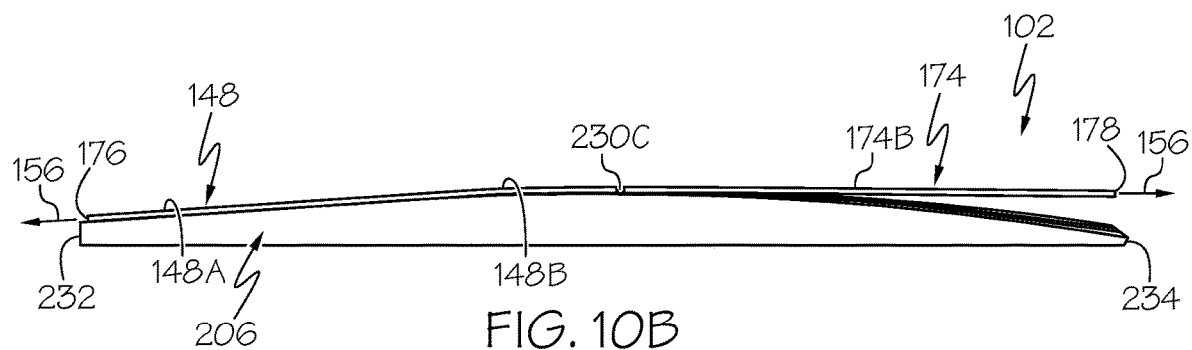

Referring to FIGS. 10A and 10B, in one or more examples, a second formed portion 148B of the composite member 102, extending from the first formed portion 148A, is shaped on the place tool 206 to from a second contour portion 162 (FIG. 6A) of the final contour 106 while holding a second remaining unformed portion 174B of the composite member 102, extending from the second formed portion 148B toward the second end 178, in the initial contour 146. For example, the composite member 102 is placed into contact with the place-tool surface 226 at a third contact point 230C to shape the second formed portion 148B. The third contact point 230C is spaced away from the second contact point 230B toward the second tool-end 234.

Figure 11A:
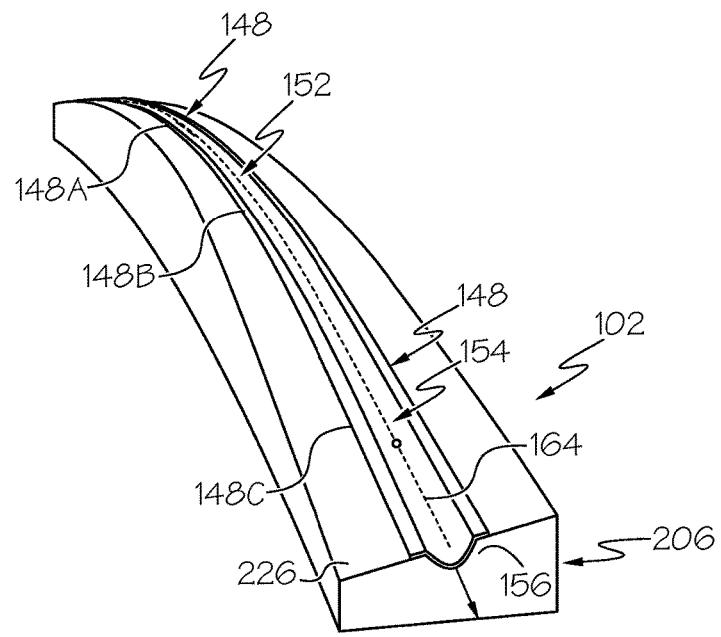
Figure 11B:
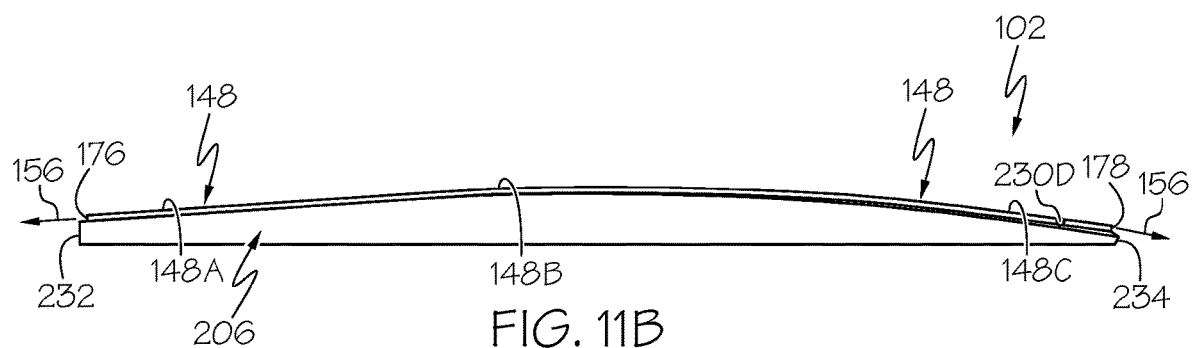

Referring to FIGS. 11A and 11B, in one or more examples, a third formed portion 148C of the composite member 102, extending from the second formed portion 148B, is shaped to from a third contour portion 164 (FIG. 11A) of the final contour 106. For example, the composite member 102 is placed into contact with the place-tool surface 226 at a fourth contact point 230D to shape the third formed portion 148C. The fourth contact point 230D is spaced away from the third contact point 230C toward the second tool-end 234.

The examples described above and depicted in FIGS. 8A-11B are illustrative of a forming sequence that begins at one end of the composite member 102 and that shapes sequential portions of the composite member 102 along the length 104 toward an opposing end of the composite member 102. While the illustrate examples describe and depict a number of (e.g., three) portions of the composite member 102 being sequentially placed on the place tool 206 and formed into portions of the final contour 106, the disclosed method 1000 is not limited to any particular number of portions. For example, the placing and forming steps describe above can be applied to any number of (e.g., less than three or greater than three) portions of the composite member 102.

In one or more examples, the tension 156 is applied and/or selectively controlled along the length 104 of the composite member 102 between the first end 176 and the second end 178. In one or more examples, the tension 156 is applied and/or selectively controlled along a portion of the length 104 of the composite member 102, such as between one of the formed portions 148 and an adjacent one of the remaining unformed portions 174 or between one of the formed portions 148 and at least one of the first end 176 and the second end 178.

As an example, the tension 156 can be selectively controlled and applied along at least a portion of the length 104 of the composite member 102 between the first end 176 and the second end 178 while forming (e.g., placing and/or shaping) the first formed portion 148A. As another example, the tension 156 can be applied along at least a portion of the length 104 of the composite member 102 between the first formed portion 148A and the second end 178 while forming (e.g., placing and/or shaping) at least one of the second formed portion 148B, the third formed portion 148C, and any other formed portions 148 between the first formed portion 148A and the second end 178. As another example, the tension 156 can be applied along a portion of the length 104 of the composite member 102 between any two of the contact points on the place-tool surface 226.

Referring again to FIG. 1, in one or more examples, the method 1000 includes a step of (block 1026) applying heat 170 to the composite member 102. In one or more examples, the step of (block 1026) applying heat 170 to the composite member 102 is performed before the step of (block 1012) placing and/or the step of (block 1014) forming the final contour 106. In one or more examples, the step of (block 1026) applying heat 170 to the composite member 102 is performed during the step of (block 1012) placing and/or the step of (block 1014) forming the final contour 106. while forming the final contour 106. In one or more examples, the step of (block 1026) applying heat 170 to the composite member 102 is performed after the step of (block 1012) placing and/or the step of (block 1014) forming the final contour 106. while forming the final contour 106.

In one or more examples, the method 1000 includes a step of (block 1028) compacting the composite member 102. Generally, the step of (block 1028) compacting includes applying a compaction pressure or force to at least a portion of the composite member 102 to compact or compress the composite member 102 against the place-tool surface 226. In one or more examples, the step of (block 1028) compacting the composite member 102 is performed during the step of (block 1012) placing and/or the step of (block 1014) forming the final contour 106. In one or more examples, the step of (block 1028) compacting the composite member 102 is performed after the step of (block 1012) placing and/or the step of (block 1014) forming the final contour 106.

In one or more examples, according to the method 1000, the step of (block 1026) applying heat 170 to the composite member 102 and the step of (block 1028) compacting the composite member 102 are performed at least approximately concurrently. In one or more examples, according to the method 1000, the step of (block 1026) applying heat 170 to the composite member 102 is performed before the step of (block 1028) compacting the composite member 102.

In one or more examples, the method 1000 includes a step of (block 1030) maintaining the cross-sectional shape 140 of the composite member 102 during the step of (block 1012) placing the composite member 102 on the place tool 206 and/or the step of (block 1014) forming the final contour 106 in the composite member 102.

In one or more examples, the method 1000 includes a step of (block 1032) curing the composite member 102 to form the composite structure 100. The composite structure 100 includes the final contour 106.

In one or more examples, the composite structure 100 is a composite stiffener 142, such as a composite stiffener utilized in the manufacture of an aircraft. In one or more examples, the composite structure 100 is a composite stringer 144, such as a composite stringer utilized in the manufacture of an aircraft.

Referring now to FIGS. 12-19, which schematically illustrate examples of the system 200 for forming the composite structure 100. In one or more examples, the system 200 operates in a manufacturing environment 250 (FIG. 12) and is configured to shape the composite member 102 and form the composite structure 100. In one or more examples, the system 200 performs one or more operations of or is used to implement the method 1000 (FIG. 1).

In one or more examples, the system 200 includes a plurality of automated manipulators 202. The automated manipulators 202 are configured to manipulate the composite member 102. In one or more examples, as illustrated in FIGS. 13-18, one or more of the automated manipulators 202 includes or takes the form of an independently movable robotic manipulator 242 (FIG. 18) or robotic arm having multiple (e.g., six) degrees of freedom. In these examples, the robotic manipulators 242 can be floor-mounted (e.g., FIGS. 13 and 15-18) or ceiling-mounted (e.g., FIG. 14). In one or more examples, as illustrated in FIG. 19, the automated manipulators 202 include or take the form of an overhead gantry 244. In these examples, each one of the automated manipulators 202 is independently movable via the gantry 244 and has multiple (e.g., three) degrees of freedom.

In one or more examples, the automated manipulators 202, in unison, pick the composite member 102 from a pick position on the pick tool 224. The automated manipulators 202 move in a coordinated fashion to place the composite member 102 into a place position on the place tool 206. During approach to the place position, each automated manipulator 202 moves along a pre-programmed motion profile, or path, to form or shape the composite member 102 to match the contour of the place-tool surface 226 at the place position. This is done in a synchronized, coordinated motion to prevent damaging the composite member 102 and to ensure that the composite member 102 is properly placed in the place position on the place tool 206.

In one or more examples, the system 200 includes the pick tool 224. The pick tool 224 supports the composite member 102, for example, in the initial contour 146, for retrieval by the automated manipulators 202.

In one or more examples, the system 200 includes the place tool 206. The place tool 206 supports the composite member 102 after forming the final contour 106. In one or more examples, the place tool 206 defines or sets forth the final contour 106 as the composite member 102 is placed and formed on the place tool 206. As an example, the place tool 206 includes the place-tool surface 226 (e.g., as shown in FIGS. 13 and 14) that includes a contour that substantially matches and sets forth the final contour 106 of the composite member 102.

As illustrated in FIGS. 4A-11B and 13-16, in one or more examples, the place tool 206 includes a groove, a cavity, recess, or other feature that is formed (e.g., machined) in the place-tool surface 226 and the is shaped to receive at least a portion of the cross-sectional shape of the composite member 102.

Referring to FIG. 12 and to FIGS. 13-19, in one or more examples, the system 200 includes a controller 204. The controller 204 is configured to execute instructions 220. Execution of the instructions 220 causes the controller 204 to perform operations using the automated manipulators 202. Generally, as described herein below, execution of the instructions 220 causes the controller 204 to direct preprogrammed and synchronized movement of the automated manipulators 202 to perform a series of operational steps.

As illustrated in FIGS. 13 and 14, in one or more examples, the operations include retrieving the composite member 102 using the automated manipulators 202. As an example, the operations include picking the composite member 102 from the pick tool 224 and moving the composite member 102 from the pick tool 224 to the place tool 206 using the automated manipulators 202.

Figure 15:
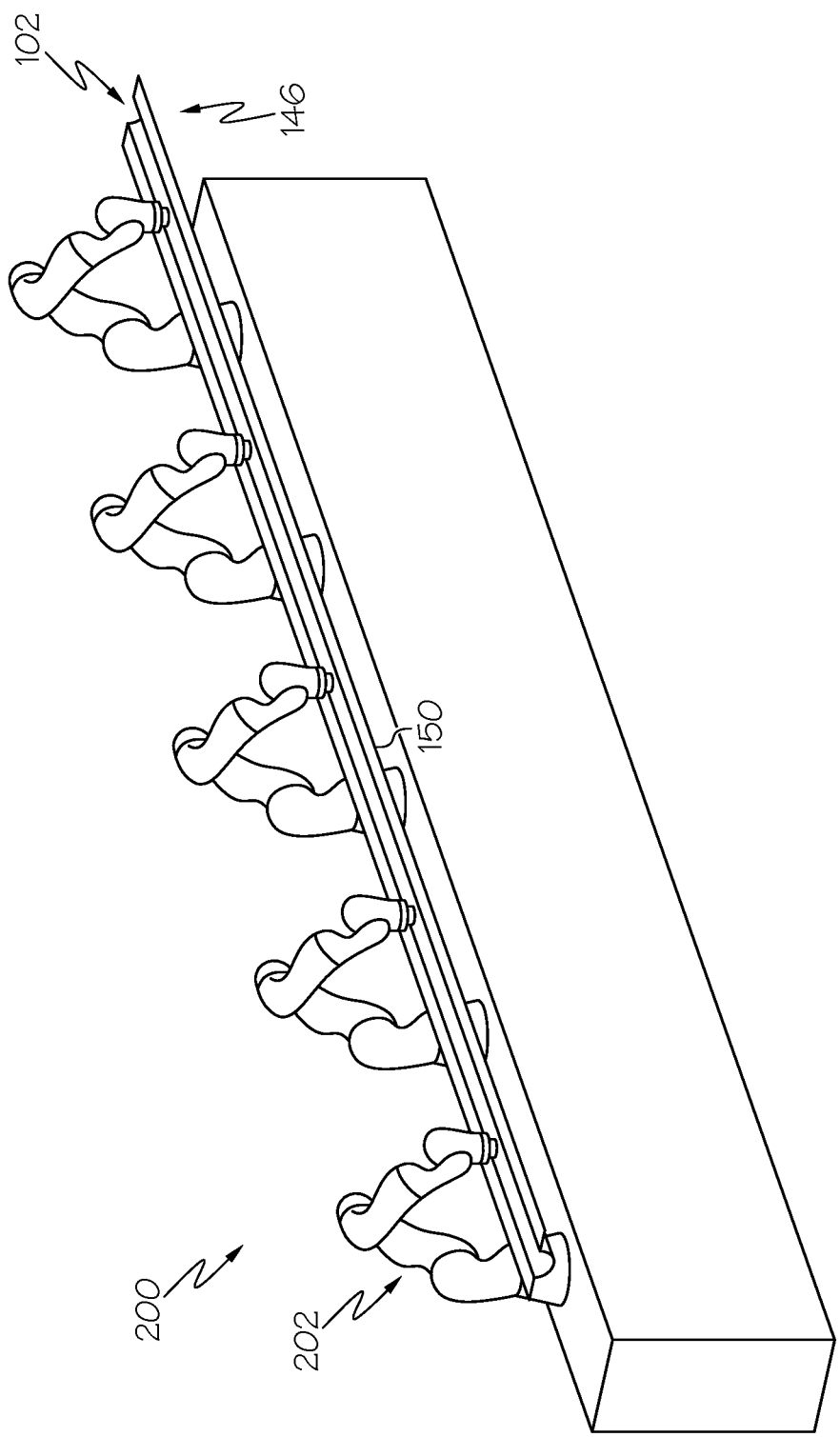
FIG. 15 is a schematic illustration of an example of a portion of the system at an initial stage of a shaping operation.
Figure 16:
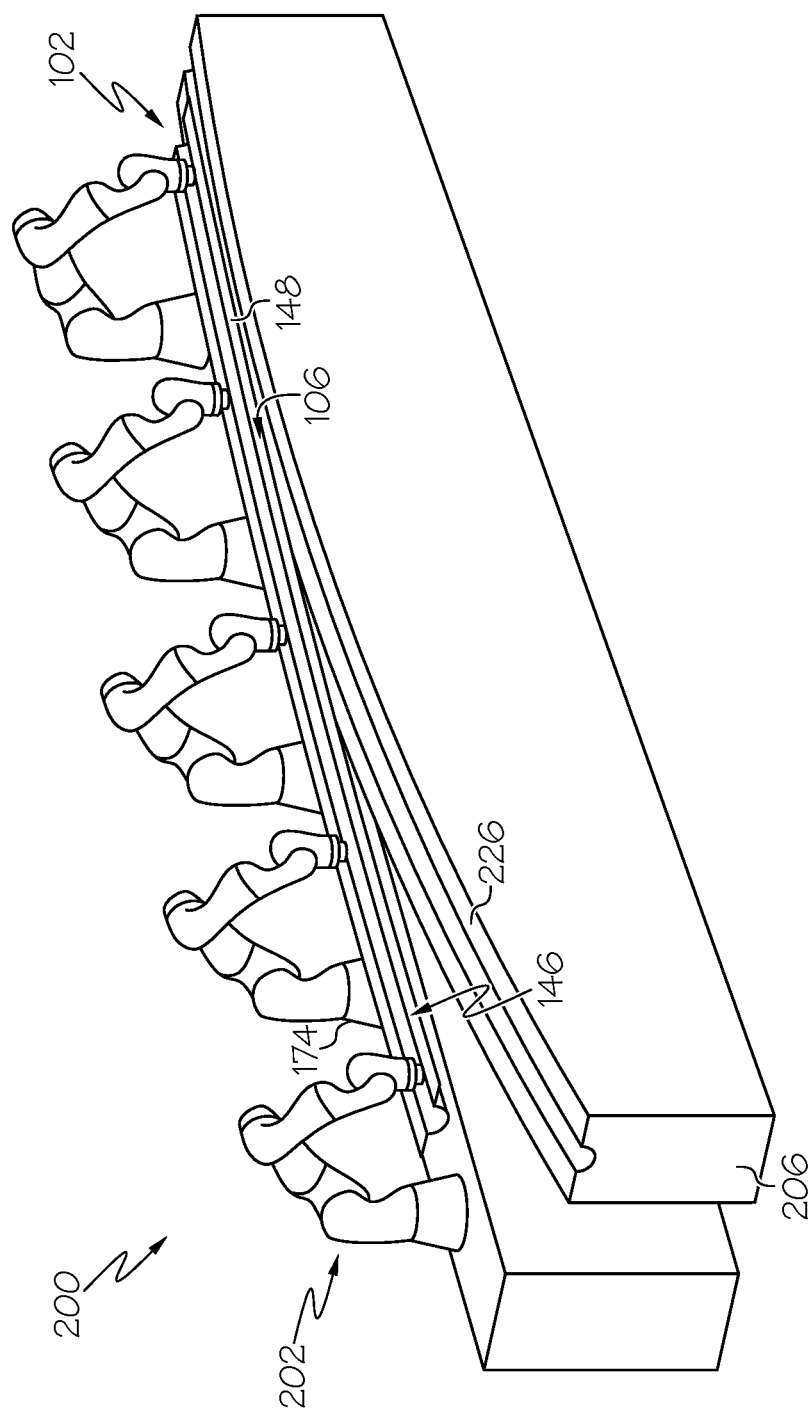
FIG. 16 is a schematic illustration of an example of the system of FIG. 15 at a subsequent stage of the shaping operation.

As illustrated in FIGS. 15 and 16, in one or more examples, the operations include holding the composite member 102 in the initial contour 146 using the automated manipulators 202 (FIG. 15). In one or more examples, the operations include placing the composite member 102 on the place tool 206 using the automated manipulators 202 (FIG. 16). In one or more examples, the operations include forming the final contour 106 along the length 104 of the composite member 102 while placing the composite member 102 on the place tool 206 using the automated manipulators 202. Generally, the final contour 106 is formed by sequentially forming or shaping the composite member 102 into the formed portions 148 on the place tool 206 using synchronized movement of ones of the automated manipulators 202, while holding unformed portions 150 of the composite member 102 in the initial contour 146 using synchronized movement of other ones of the automated manipulators 202.

As an example, portions 152 of the final contour 106 are formed in the composite member 102 by sequentially forming or shaping the unformed portions 150 into the formed portions 148 on the place tool 206 using ones of the automated manipulators 202, while holding the remaining unformed portions 174 of the composite member 102 in the initial contour 146 using other ones of the automated manipulators 202. Other portions 154 of the final contour 106 are formed in the composite member 102 by then sequentially forming or shaping the remaining unformed portions 174 into the formed portions 148 on the place tool 206 using ones of the automated manipulators 202.

In one or more examples, the operations include applying tension 156 along at least a portion of the length 104 of the composite member 102, such as to at least one of the formed portions 148, the unformed portions 150, and/or the remaining unformed portions 174 of the composite member 102 using ones of the automated manipulators 202, while forming the final contour 106 along the length 104 of the composite member 102 using other ones of the automated manipulators 202.

In one or more examples, the operations include selectively controlling or otherwise varying the tension 156 applied to at least one of the remaining unformed portions 174 of the composite member 102 using ones of the automated manipulators 202, while forming the final contour 106 along the length 104 of the composite member 102 using other ones of the automated manipulators 202.

Figure 18:
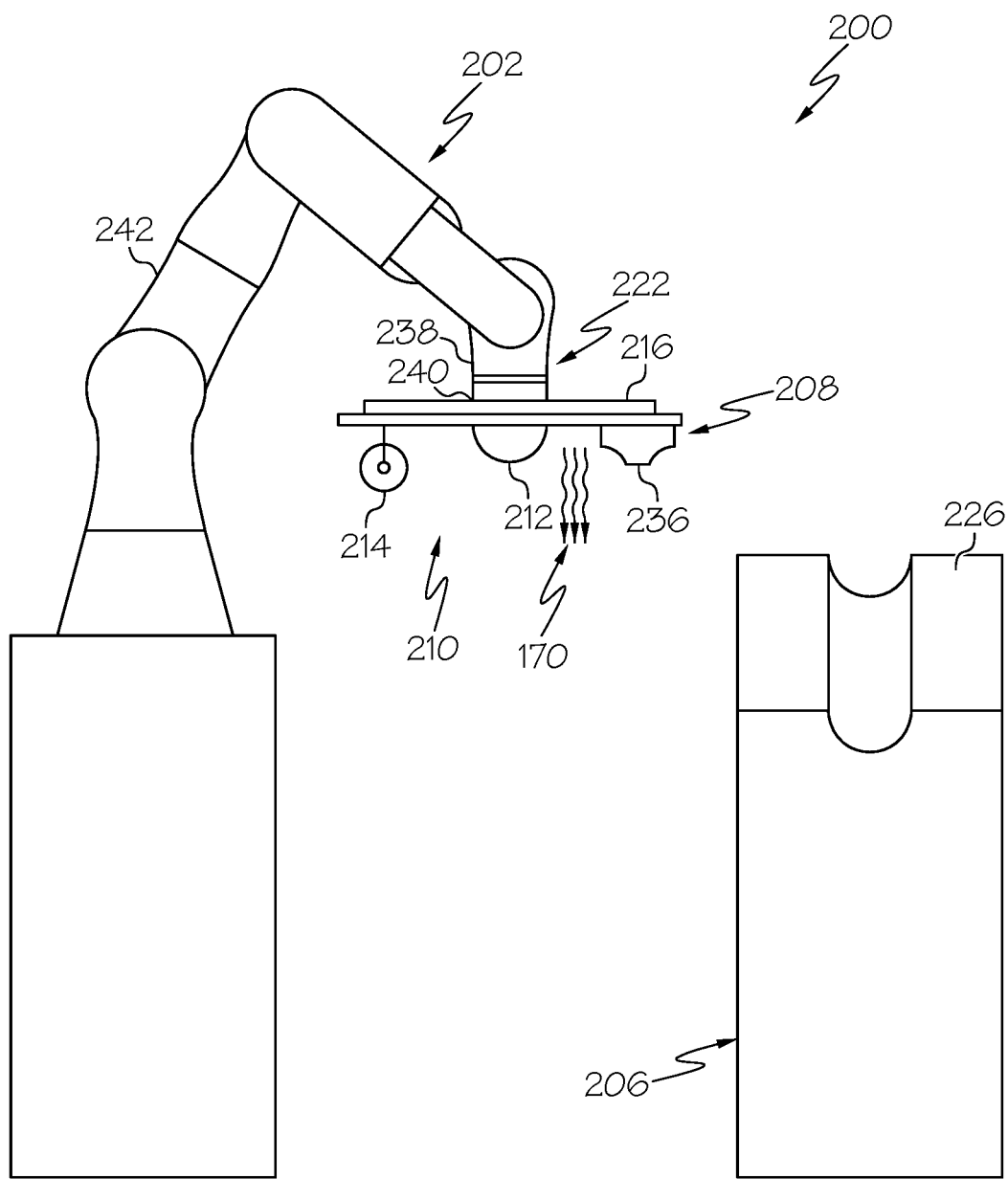
FIG. 18 is a schematic illustration of an example of a portion of the system.

Referring now to FIGS. 12 and 18, in one or more examples, each one of the automated manipulators 202 includes a gripper 208. The gripper 208 is configured to selectively hold or release the composite member 102, for example, upon direction from the controller 204. In one or more examples, the gripper 208 includes or takes the form of a vacuum gripper 236. In other examples, the gripper 208 includes or takes the form of any other suitable gripper mechanism, such as a mechanical gripper, an electrostatic gripper, an adhesive gripper, and the like.

In one or more examples, each one of the automated manipulators 202 includes a compactor 210. The operations include compacting the composite member 102 using the compactor 210, after forming the final contour 106 along the length 104 of the composite member 102. In one or more examples, the compactor 210 includes or takes the form of a vacuum compactor 212. In one or more examples, the compactor 210 includes or takes the form of a roller compactor 214.

In one or more examples, the vacuum gripper 236 and the vacuum compactor 212 are integrated into a single, unitary vacuum unit. As an example, the vacuum unit includes a plurality of vacuum zones that are selectively activated. In these examples, a central vacuum zone is activated to pick, move, and hold the composite member 102 during retrieval, placement, and formation. After placement of the composite member 102 on the place tool 206 and formation of a portion of the final contour 106, additional vacuum zones are then activated to compact a portion of the composite member 102 against the place-tool surface 226.

In one or more examples, each one of the automated manipulators 202 includes a heater 216. The operations include applying heat 170 to the composite member 102 using the heater 216, while forming the final contour 106 along the length 104 of the composite member 102. In one or more examples, the operations include applying heat 170 to the composite member 102 while compacting the composite member 102.

In one or more examples, each one of the automated manipulators 202 includes an end effector 222. In one or more examples, the gripper 208, the compactor 210, and the heater 216 are integrated into the end effector 222. As an example, the end effector 222 is coupled to the automated manipulator 202 by a rotary coupling 238 that is configured to rotate or otherwise move the end effector 222 relative to the automated manipulator 202 to selectively utilize one or more of the gripper 208, the compactor 210, and the heater 216.

In one or more examples, the end effector 222 is self-aligning. As an example, the end effector 222 is coupled to the automated manipulator 202 by a joint coupling 240 that is configured to selectively enable free linear and/or angular motion of the end effector 222 relative to the automated manipulator 202 and to selectively lock a linear position and/or angular orientation of the end effector 222 relative to the automated manipulator 202.

In other examples, the compactor 210 and/or the heater 216 are not integrated into an end effector with the gripper 208 or are otherwise independent devices. In these examples, the compactor 210 and/or the heater 216 are coupled to a dedicated automated manipulator for selective positioning during the compacting and/or heating operations.

In one or more examples, synchronized motion of the automated manipulators 202 is selectively controlled to sequentially place portions of the composite member 102 on the place tool 206, form portions of the final contour 106 in the composite member 102 while being placed on the place tool 206, and hold portions of the composite member 102 in the initial contour 146. As described above and illustrated in FIGS. 4A-11B, synchronized motion of the automated manipulators 202 can utilize different sequences of placing and shaping portions of the composite member 102.

Figure 17:
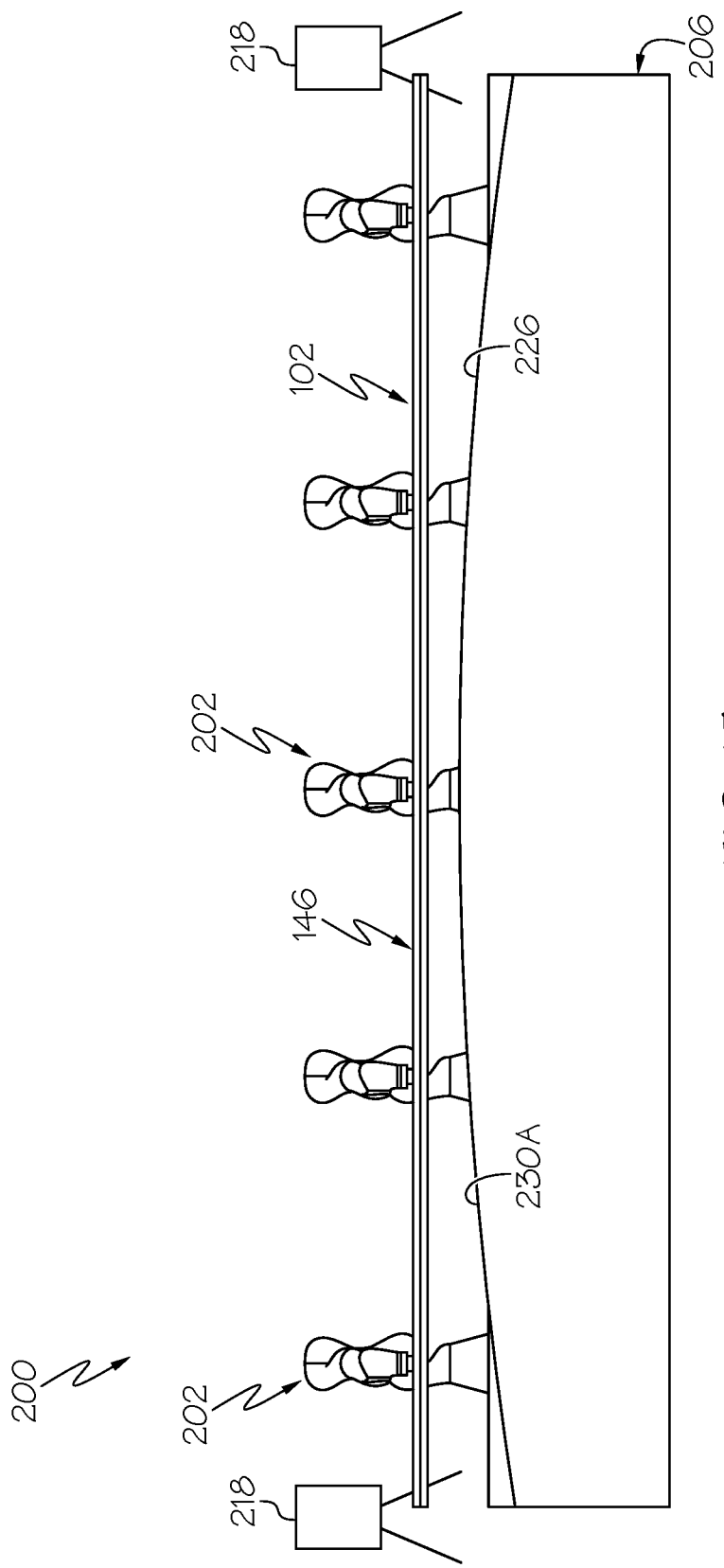
FIG. 17 is a schematic illustration of an example of a portion of the system.

Referring now to FIGS. 12 and 17, in one or more examples, the system 200 includes a sensor 218. In one or more examples, the sensor 218 is configured to detect a location of the composite member 102. In one or more examples, the sensor 218 is configured to detect a location of the place tool 206. The sensor 218 can include one or more suitable sensor devices.

As an example, the sensor 218 is configured to detect a location of the composite member 102 relative to the pick tool 224, for example, prior to and/or during the picking operation. As an example, the sensor 218 is configured to detect a location of the composite member 102 relative to the place tool 206, for example, during the moving operation, the holding operation, the placing operation, and the forming operation. As an example, the sensor 218 is configured to detect a location of the place tool 206, for example, prior to and/or during the placing operation and the forming operation.

In one or more examples, the operations include locating at least a portion of the composite member 102 relative to the place tool 206 before placing the composite member 102 on the place tool 206 using the locations detected by the sensor 218. In one or more examples, the operations include adjusting a location of the composite member 102 relative to the place tool 206 based on a location detected by the sensor 218. As an example, the sensor 218 detects at least a portion of the place tool 206, such as at least one of the first tool-end 232 and the second tool-end 234 of the place tool 206, to determine a location of the place-tool surface 226. The automated manipulators 202 suitably locate the composite member 102 relative to the place-tool surface 226 such that a proper portion of the composite member 102 is initially placed on the place-tool surface 226 at the first contact point 230A.

Figure 20:
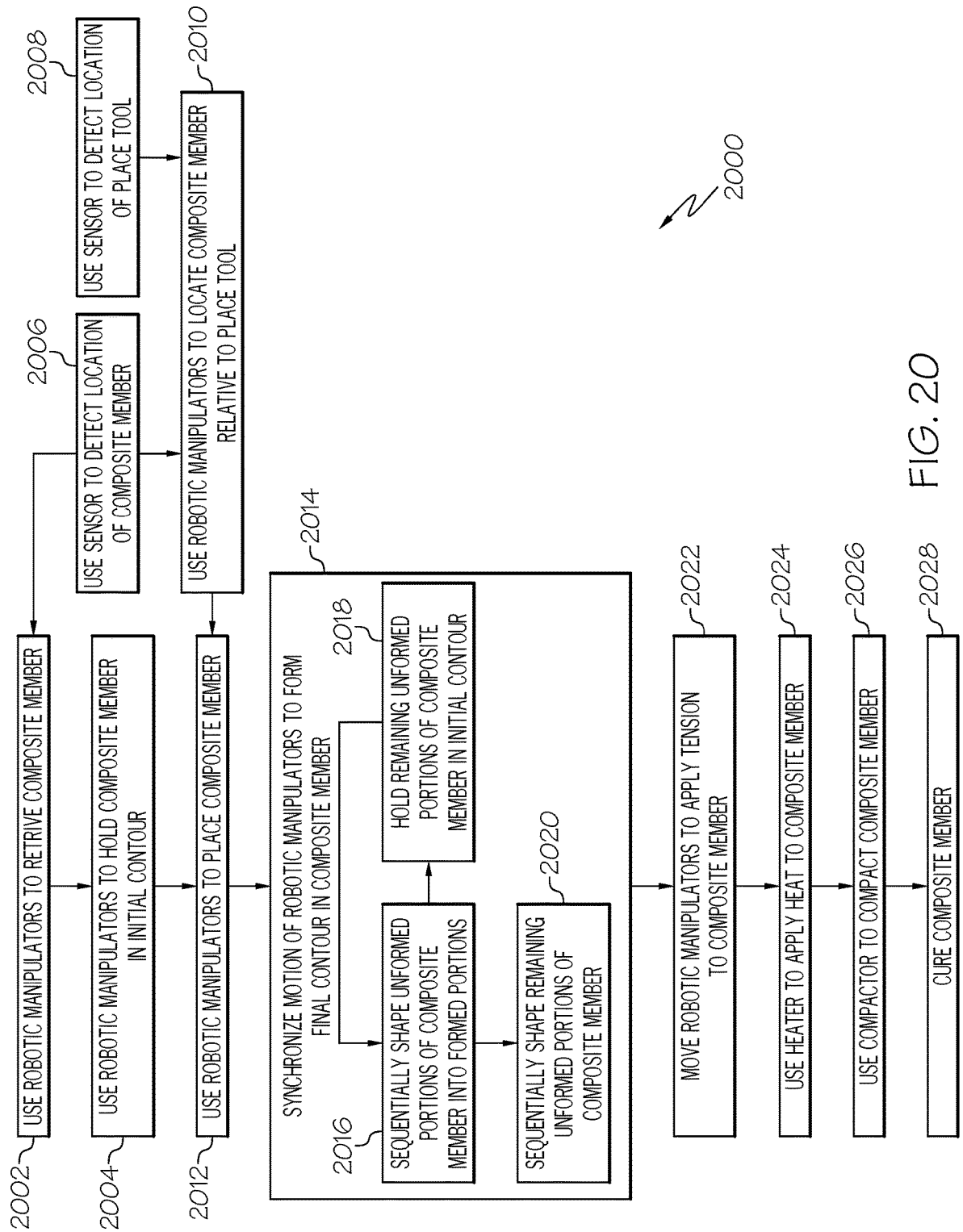
FIG. 20 is a flow diagram of an example an automated method for shaping a composite member.

Referring now to FIG. 20, which illustrates an example of the automated method 2000 for shaping the composite structure 100. In one or more examples, the method 2000 is implemented using the system 200 (FIG. 12).

Referring to FIG. 20 and to FIGS. 12-14, in one or more examples, the automated method 2000 includes a step of (block 2002) using the automated manipulators 202, under direction from the controller 204, to retrieve the composite member 102. As an example, the automated manipulators 202, under direction from the controller 204, pick the composite member 102, for example, in the initial contour 146, from the pick tool 224 and move the composite member 102, in the initial contour 146, to the place tool 206.

Referring to FIG. 20 and to FIG. 15, in one or more examples, the automated method 2000 includes a step of (block 2004) using the automated manipulators 202 to hold the composite member 102 in the initial contour 146 along the length 104 of the composite member 102.

Referring to FIG. 20 and to FIGS. 12 and 17, in one or more examples, the automated method 2000 includes a step of (block 2006) using the sensor 218 to detect a location of the composite member 102. In one or more examples, the automated method 2000 includes a step of (block 2008) using the sensor 218 to detect a location of the place tool 206. In one or more examples, the automated method 2000 includes a step of (block 2010) using the automated manipulators 202 to locate the composite member 102 or adjust the location of the composite member 102 relative to the place tool 206 based on locations detected by the sensor 218.

Referring to FIG. 20 and to FIG. 16, in one or more examples, the automated method 2000 includes a step of (block 2012) synchronizing motion of the automated manipulators 202 to sequentially place the composite member 102 on the place tool 206. In one or more examples, the automated method 2000 includes a step of (block 2014) synchronizing motion of the automated manipulators 202 to form the final contour 106 along the length 104 of the composite member 102. Generally, the step of (block 2006) synchronizing motion of the automated manipulators 202 to sequentially place the composite member 102 on the place tool 206 and the step of (block 2008) synchronizing motion of the automated manipulators 202 to form the final contour 106 in the composite member 102 are performed concurrently.

In one or more examples, the final contour 106 is formed by sequentially shaping the formed portions 148 of the composite member 102 on the place tool 206, while holding the unformed portions 150 of the composite member 102 in the initial contour 146 to form portions 152 of the final contour 106. The final contour 106 is further formed by sequentially shaping the unformed portions 150 of the composite member 102 on the place tool 206 to form other portions 154 of the final contour 106.

Referring to FIG. 20 and to FIGS. 4A-11B, in one or more examples, the step of (block 2014) synchronizing motion of the automated manipulators 202 to form the final contour 106 in the composite member 102 includes a step of (block 2016) synchronizing motion of the automated manipulators 202 to sequentially form or shape the unformed portions 150 of the composite member 102 into the formed portions 148 of the composite member 102, a step of (block 2018) synchronizing motion of the automated manipulators 202 to hold the remaining unformed portions 174 of the composite member 102 in the initial contour 146, and a step of (block 2020) synchronizing motion of the automated manipulators 202 to sequentially form or shape the remaining unformed portions 174 of the composite member 102 into the formed portions 148.

In one or more examples, the automated method 2000 includes a step of (block 2022) moving at least one of the automated manipulators 202 relative to at least another one of the automated manipulators 202 to apply the tension 156 to at least a portion of the composite member 102, while forming the final contour 106 along the length 104 of the composite member 102.

Referring to FIG. 20 and to FIGS. 12 and 18, in one or more examples, the automated method 2000 includes a step of (block 2024) using the heater 216 of at least one of the automated manipulators 202 to apply heat 170 to the composite member 102, for example, before and/or while forming the final contour 106 along the length 104 of the composite member 102.

In one or more examples, the automated method 2000 includes a step of (block 2026) using the compactor 210 of at least one of the automated manipulators 202 to compact the composite member 102, after forming the final contour 106 along the length 104 of the composite member 102.

In one or more examples, the automated method 2000 includes a step of (block 2028) curing the composite member 102 to form the composite structure 100. The composite structure 100 having the final contour 106. In one or more examples, the composite member 102 is cured on the place tool 206. In other examples, the composite member 102, having the final contour 106, is moved from the place tool 206 to a dedicated cure tool for curing.

Figure 21:
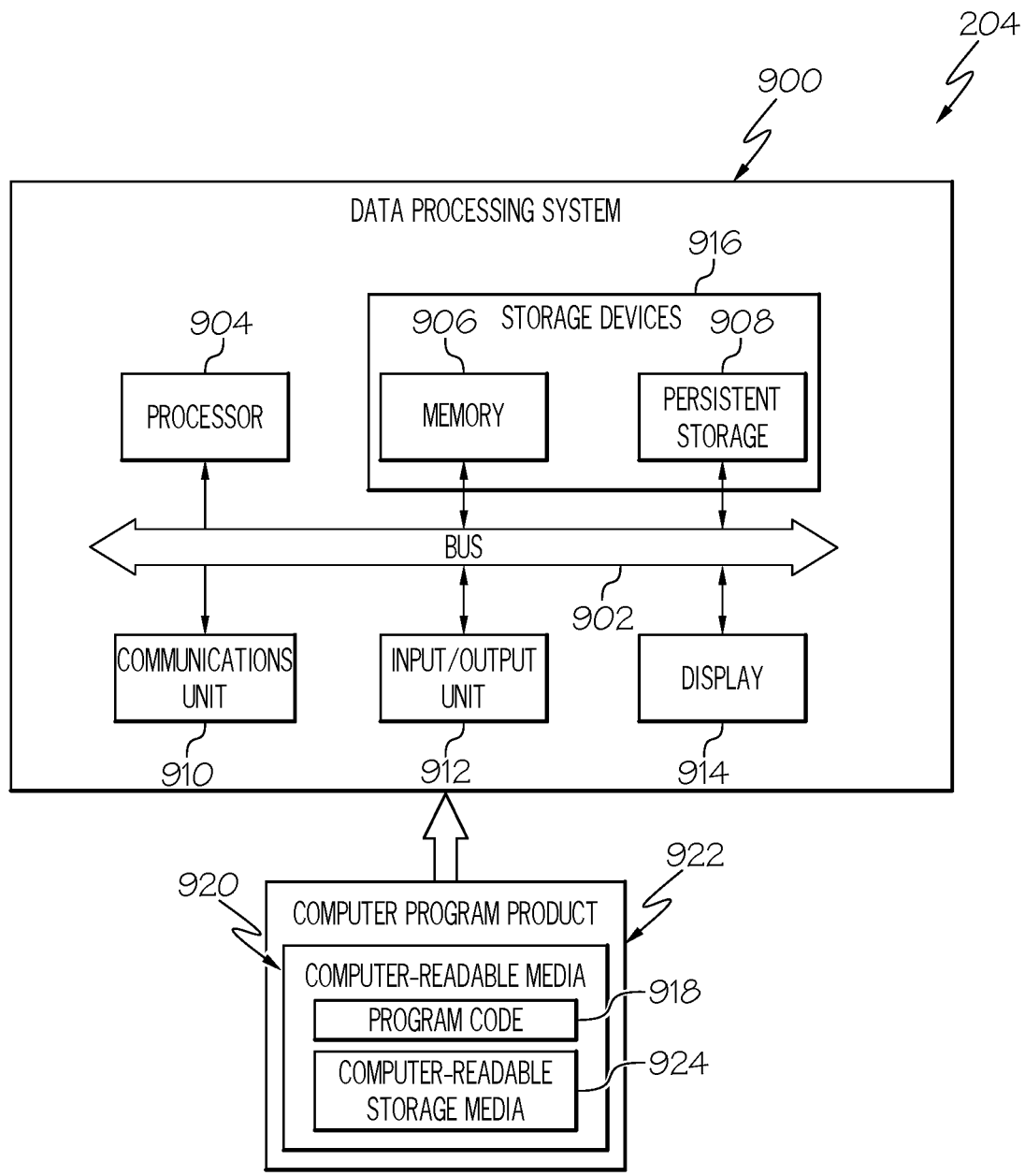
FIG. 21 is a block diagram of an example of a data processing system.

Referring now to FIG. 21, in one or more examples, the controller 204 (FIG. 12) includes a data processing system 900. In one or more examples, the data processing system 900 includes a communications framework 902, which provides communications between at least one processor 904, one or more storage devices 916, such as memory 906 and/or persistent storage 908, a communications unit 910, an input/output unit 912 (I/O unit), and a display 914. In this example, the communications framework 902 takes the form of a bus system.

The processor 904 serves to execute the instructions 220 (FIG. 1) for software that can be loaded into the memory 906. In one or more examples, the processor 904 is a number of processor units, a multi-processor core, or some other type of processor, depending on the particular implementation.

The memory 906 and the persistent storage 908 are examples of the storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. The storage devices 916 may also be referred to as computer readable storage devices in one or more examples. The memory 906 is, for example, a random-access memory or any other suitable volatile or non-volatile storage device. The persistent storage 908 can take various forms, depending on the particular implementation.

For example, the persistent storage 908 contains one or more components or devices. For example, the persistent storage 908 is a hard drive, a solid-state hard drive, a flash memory, a rewritable optical disk, a rewritable magnetic tape, or some combination of the above. The media used by the persistent storage 908 also can be removable. For example, a removable hard drive can be used for the persistent storage 908.

The communications unit 910 provides for communications with other systems or devices, such as the automated manipulators 202, the grippers 208, the compactors 210, the heaters 216, and the sensors 218 (FIG. 12). In one or more examples, the communications unit 910 is a network interface card.

Input/output unit 912 allows for input and output of data with other devices that can be connected to the data processing system 900. As an example, the input/output unit 912 provides a connection for user input through at least one of a keyboard, a mouse, or some other suitable input device. Further, the input/output unit 912 can send output to a printer. The display 914 provides a mechanism to display information to a user.

Instructions (e.g., instructions 220) for at least one of the operating system, applications, or programs can be located in the storage devices 916, which are in communication with the processor 904 through the communications framework 902. The processes of the various examples and operations described herein can be performed by the processor 904 using computer-implemented instructions, which can be located in a memory, such as the memory 906.

The instructions 220 are referred to as program code, computer usable program code, or computer readable program code that can be read and executed by a processor of the processor 904. The program code in the different examples can be embodied on different physical or computer readable storage media, such as the memory 906 or the persistent storage 908.

In one or more examples, the program code 918 is located in a functional form on computer readable media 920 that is selectively removable and can be loaded onto or transferred to the data processing system 900 for execution by the processor 904. In one or more examples, the program code 918 and computer readable media 920 form the computer program product 922. In one or more examples, the computer readable media 920 is computer readable storage media 924.

In one or more examples, the computer readable storage media 924 is a physical or tangible storage device used to store the program code 918 rather than a medium that propagates or transmits the program code 918.

Alternatively, the program code 918 can be transferred to the data processing system 900 using a computer readable signal media. The computer readable signal media can be, for example, a propagated data signal containing the program code 918. For example, the computer readable signal media can be at least one of an electromagnetic signal, an optical signal, or any other suitable type of signal. These signals can be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different examples can be implemented. The different examples can be implemented in a data processing system including components in addition to or in place of those illustrated for the data processing system 900. Other components shown in FIG. 21 can be varied from the examples shown. The different examples can be implemented using any hardware device or system capable of running the program code 918.

Additionally, various components of the controller 204 and/or the data processing system 900 may be described as modules. For the purpose of the present disclosure, the term "module" includes hardware, software or a combination of hardware and software. As an example, a module can include one or more circuits configured to perform or execute the described functions or operations of the executed processes described herein (e.g., the method 1000 and/or the automated method 2000). As another example, a module includes a processor, a storage device (e.g., a memory), and computer-readable storage medium having instructions that, when executed by the processor causes the processor to perform or execute the described functions and operations. In one or more examples, a module takes the form of the program code 918 and the computer readable media 920 together forming the computer program product 922.

Figure 22:
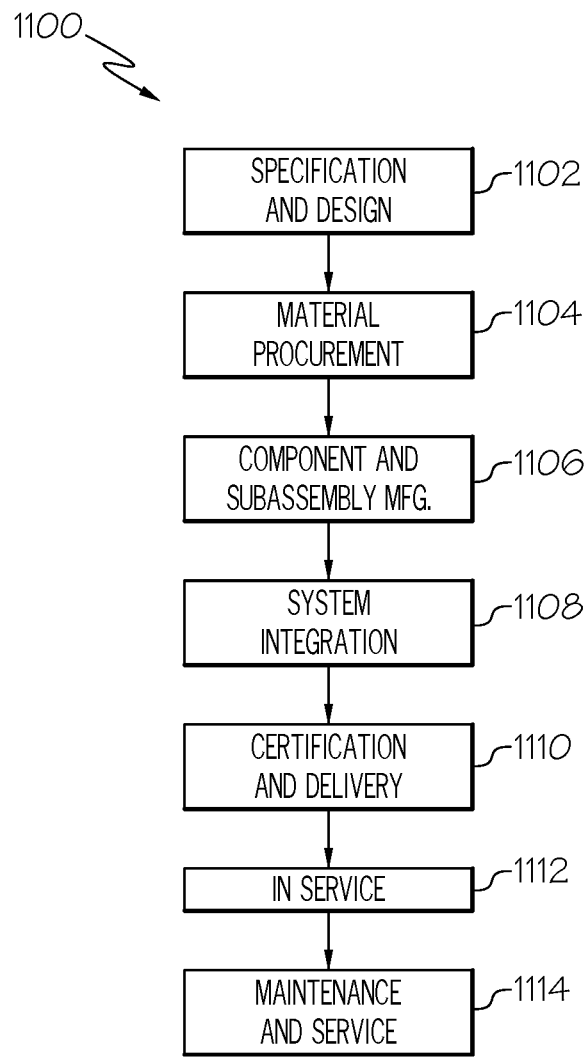
FIG. 22 is a flow diagram of an example of an aircraft manufacturing method.
Figure 23:
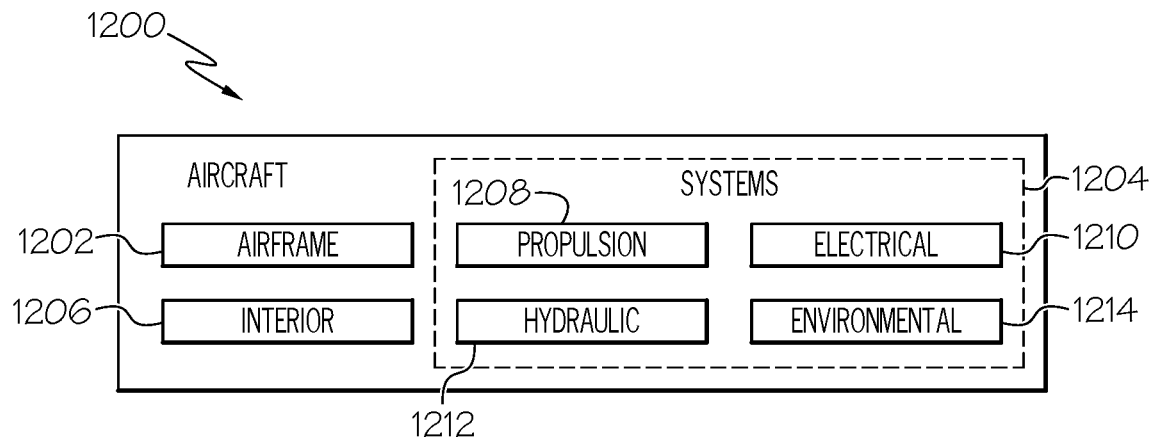
FIG. 23 is a schematic block diagram of an example of an aircraft.

Referring now to FIGS. 22 and 23, examples of the method 1000, the automated method 2000, and/or the system 200 described herein, may be related to, or used in the context of, an aircraft manufacturing and service method 1100, as shown in the flow diagram of FIG. 22 and an aircraft 1200, as schematically illustrated in FIG. 23. For example, the aircraft 1200 and/or the aircraft production and service method 1100 may utilize composite structures 100 (FIG. 12) shaped and/or formed using the system 200 and/or according to the method 1000 or the method 2000.

Referring to FIG. 23, which illustrates an example of the aircraft 1200. The aircraft 1200 also includes an airframe 1202 having an interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to an airframe 1202 of the aircraft 1200, such as for example, flaps, spoilers, ailerons, slats, rudders, elevators, and trim tabs. In yet other examples, the onboard systems 1204 also includes one or more other systems, such as, but not limited to, communications systems, avionics systems, software distribution systems, network communications systems, passenger information/entertainment systems, guidance systems, radar systems, weapons systems, and the like. The aircraft 1200 may include various composite structures 100 having desired final contours and that form a portion of the airframe 1202, the interior 1206, and/or one or more of the onboard systems 1204, such as composite stiffeners 142, composite stringers 144, and the like.

Referring to FIG. 22, during pre-production of the aircraft 1200, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 22 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the method 1000, the method 2000, and the system 200 shown and described herein, may be employed during any one or more of the stages of the manufacturing and service method 1100 shown in the flow diagram illustrated by FIG. 22. In an example, shaping and forming composite structures having a desired final (e.g., complex) contour using the system 200 and/or according to the method 1000 or the method 2000 may form a portion of component and subassembly manufacturing (block 1106) and/or system integration (block 1108). Further, shaping and forming composite structures having a desired final (e.g., complex) contour using the system 200 and/or according to the method 1000 or the method 2000 may be implemented in a manner similar to components or subassemblies prepared while the aircraft 1200 is in service (block 1112). Also, composite structures having a desired final (e.g., complex) contour that are shaped and formed using the system 200 and/or according to the method 1000 or the method 2000 may be utilized during system integration (block 1108) and certification and delivery (block 1110). Similarly, composite structures having a desired final (e.g., complex) contour that are shaped and formed using the system 200 and/or according to the method 1000 or the method 2000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 2-19, 21 and 23, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 2-19, 21 and 23, referred to above, need be included in every example and not all elements, features, and/or components described herein are necessarily depicted in each illustrative example. Accordingly, some of the elements, features, and/or components described and illustrated in FIGS. 2-19, 21 and 23 may be combined in various ways without the need to include other features described and illustrated in FIGS. 2-19, 21 and 23, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 2-19, 21 and 23, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 2-19, 21 and 23, and such elements, features, and/or components may not be discussed in detail herein with reference to each of FIGS. 2-19, 21 and 23. Similarly, all elements, features, and/or components may not be labeled in each of FIGS. 2-19, 21 and 23, but reference numerals associated therewith may be utilized herein for consistency.

In FIGS. 1, 20 and 22, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 1, 20 and 22 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the method 1000, the automated method 2000, and the system 200 have been shown and described, modifications may occur to those skilled in the art upon reading the specification. The present application includes such modifications and is limited only by the scope of the claims.

What is claimed is:

1. A method for shaping a composite structure, the method comprising steps of:
    holding a composite member in an initial contour along a length of the composite member, wherein the composite member comprises a nonplanar cross-sectional shape, viewed along a longitudinal axis of the composite member;
    forming a final contour along the length of the composite member by:
        placing a first portion of the composite member at a first contact point on a place-tool surface of a place tool while holding the composite member in the initial contour;
        sequentially shaping unformed portions of the composite member into formed portions at sequentially located contact points along the place-tool surface of the place tool while holding remaining unformed portions of the composite member in the initial contour; and
        sequentially shaping the remaining unformed portions of the composite member at sequentially located subsequent contact points along the place-tool surface of the place tool; and
    maintaining the nonplanar cross-sectional shape of the composite member while forming the final contour by receiving at least a portion of the nonplanar cross-sectional shape of the composite member in a recess formed in the place-tool surface.

2. The method of claim 1, further comprising selectively applying tension along at least a portion of the length of the composite member while forming the final contour along the length of the composite member.

3. The method of claim 2, further comprising varying the tension applied to at least a portion of the length of the composite member while forming the final contour along the length of the composite member.

4. The method of claim 1, wherein more than one of the unformed portions are concurrently shaped into the formed portions.

5. The method of claim 1, wherein each one of the unformed portions is consecutively shaped into one of the formed portions.

6. The method of claim 1, further comprising applying heat to the composite member while forming the final contour along the length of the composite member.

7. The method of claim 1, further comprising compacting the composite member after forming the final contour along the length of the composite member.

8. The method of claim 1, further comprising:
detecting a location of the composite member relative to the place tool; and
adjusting the composite member relative to the place tool based on the location detected.

9. A system for forming a composite structure, the system comprising:
a plurality of automated manipulators configured to manipulate a composite member, wherein the composite member comprises a nonplanar cross-sectional shape, viewed along a longitudinal axis of the composite member;
a place tool comprising a place-tool surface having a contour that defines a final contour of the composite structure and comprising a recess configured to receive at least a portion of the nonplanar cross-sectional shape of the composite member; and
a controller configured to execute instructions, wherein execution of the instructions causes the controller to perform operations using the automated manipulators, the operations comprising:
holding the composite member in an initial contour along a length of the composite member;
placing a first portion of the composite member on at a first contact point on the place-tool surface of the place tool while holding the composite member in the initial contour; and
forming a final contour along the length of the composite member while placing the composite member on the place tool by:
sequentially shaping unformed portions of the composite member into formed portions at sequentially located contact points along the place-tool surface of the place tool while holding remaining unformed portions of the composite member in the initial contour; and
sequentially shaping the remaining unformed portions of the composite member at sequentially located subsequent contact points along the place-tool surface of the place tool,
wherein the nonplanar cross-sectional shape of the composite member is maintained while forming the final contour by receiving at least a portion of the nonplanar cross-sectional shape of the composite member in the recess formed in the place-tool surface.

10. The system of claim 9, wherein the operations further comprise selectively applying tension along at least a portion of length of the composite member while forming the final contour along the length of the composite member.

11. The system of claim 9, wherein:
each one of the automated manipulators comprises a gripper; and
the gripper is configured to selectively hold or release the composite member.

12. The system of claim 11, wherein:
each one of the automated manipulators comprises a compactor; and
the operations further comprise compacting the composite member after forming the final contour along the length of the composite member.

13. The system of claim 12, wherein:
each one of the automated manipulators comprises a heater; and
the operations further comprise applying heat to the composite member while forming the final contour along the length of the composite member.

14. The system of claim 13, wherein:
each one of the automated manipulators comprises an end effector; and
the gripper, the compactor, and the heater are integrated into the end effector.

15. The system of claim 9, further comprising a sensor configured to detect a location of the composite member relative to the place tool,
wherein the operations further comprise:
locating at least a portion of the composite member relative to the place tool before placing the composite member on the place tool; and
adjusting the composite member relative to the place tool based on a location detected by the sensor.

16. An automated method for shaping a composite structure, the automated method comprising steps of:
using a plurality of automated manipulators to hold a composite member in an initial contour along a length of the composite member, wherein the composite member comprises a nonplanar cross-sectional shape, viewed along a longitudinal axis of the composite member; and
synchronizing motion of the automated manipulators to form a final contour along the length of the composite member, wherein the final contour is formed by:
placing a first portion of the composite member at a first contact point on a place-tool surface of a place tool while holding the composite member in the initial contour;
sequentially shaping unformed portions of the composite member into formed portions at sequentially located contact points along the place-tool surface of the place tool while holding remaining unformed portions of the composite member in the initial contour;
sequentially shaping the remaining unformed portions of the composite member at sequentially located subsequent contact points along the place-tool surface of the place tool; and
maintaining the nonplanar cross-sectional shape of the composite member while forming the final contour by receiving at least a portion of the nonplanar cross-sectional shape of the composite member in a recess formed in the place-tool surface.

17. The automated method of claim 16, further comprising moving at least one of the automated manipulators relative to at least another one of the automated manipulators to apply tension along at least a portion of the length of the composite member while forming the final contour along the length of the composite member.

18. The automated method of claim 16, further comprising using a heater of at least one of the automated manipulators to apply heat to the composite member while forming the final contour along the length of the composite member.

19. The automated method of claim 16, further comprising using a compactor of at least one of the automated manipulators to compact the composite member after forming the final contour along the length of the composite member.

20. The automated method of claim 16, further comprising:
using a sensor to detect a location of the composite member relative to the place tool;
locating at least a portion of the composite member relative to the place tool before placing the composite member on the place tool; and adjusting the composite member relative to the place tool based on the location detected by the sensor.

\* \* \* \* \*